US012217508B2

(12) United States Patent
Ariyoshi et al.

(10) Patent No.: US 12,217,508 B2
(45) Date of Patent: Feb. 4, 2025

(54) PROCESSING APPARATUS, PROCESSING METHOD, AND NON-TRANSITORY STORAGE MEDIUM

(71) Applicant: NEC Corporation, Tokyo (JP)

(72) Inventors: Masayuki Ariyoshi, Tokyo (JP); Kazumine Ogura, Tokyo (JP); Tatsuya Sumiya, Tokyo (JP); Toshiyuki Nomura, Tokyo (JP); Shingo Yamanouchi, Tokyo (JP)

(73) Assignee: NEC CORPORATION, Tokyo (JP)

( * ) Notice: Subject to any disclaimer, the term of this patent is extended or adjusted under 35 U.S.C. 154(b) by 425 days.

(21) Appl. No.: 17/641,016

(22) PCT Filed: Oct. 25, 2019

(86) PCT No.: PCT/JP2019/041975
§ 371 (c)(1),
(2) Date: Mar. 7, 2022

(87) PCT Pub. No.: WO2021/079501
PCT Pub. Date: Apr. 29, 2021

(65) Prior Publication Data
US 2022/0335724 A1  Oct. 20, 2022

(51) Int. Cl.
G06V 20/52 (2022.01)
G06T 7/20 (2017.01)
G06V 10/20 (2022.01)

(52) U.S. Cl.
CPC .......... *G06V 20/52* (2022.01); *G06T 7/20* (2013.01); *G06V 10/255* (2022.01); *G06T 2207/10044* (2013.01)

(58) Field of Classification Search
CPC ...... G06V 20/52; G06V 10/255; G06V 20/40; G06V 20/194; G06V 20/80;
(Continued)

(56) References Cited

U.S. PATENT DOCUMENTS

| 6,777,684 B1* | 8/2004 | Volkov | G01N 21/3581 |
| | | | 343/915 |
| 2008/0116374 A1* | 5/2008 | Ouchi | G01S 13/887 |
| | | | 250/306 |

(Continued)

FOREIGN PATENT DOCUMENTS

| EP | 2204671 A1 | 7/2010 |
| JP | 2005-045712 A | 2/2005 |

(Continued)

OTHER PUBLICATIONS

International Search Report for PCT Application No. PCT/JP2019/041975, mailed on Dec. 24, 2019.

(Continued)

*Primary Examiner* — Jose L Couso
(74) *Attorney, Agent, or Firm* — Sughrue Mion, PLLC

(57) ABSTRACT

The present invention provides a processing system (20) including an image capturing unit (21) that captures an image of a person passing through a first area and generates a person image indicating an appearance of the person, an electromagnetic wave transmission/reception unit (22) that emits an electromagnetic wave having a wavelength of 30 micrometers or more and 1 meter or less toward the person passing through the first area, and receives a reflected wave, a determination unit (23) that determines whether the person possesses a pre-designated object, based on a signal of the received reflected wave, and a registration unit (24) that registers, in a first list, the person image of the person determined to possess the pre-designated object.

13 Claims, 24 Drawing Sheets

(58) Field of Classification Search
CPC ........... G06V 2201/05; G06V 2201/07; G06V 40/16; G06V 40/161; G06V 40/172; G06V 40/20; G06T 7/20; G06T 2207/10044; G06T 2207/30196; G01S 13/867; G01S 13/887; G01S 13/89; G01S 13/4454; G01S 13/50; G01S 17/89; G01S 17/4802; G01S 7/22; G08B 13/19602; G08B 21/02; G08B 13/2494; G08B 29/185; G08B 13/196; G08B 25/00; G08B 15/00; H04N 7/188; H04N 23/00; H04N 5/77; H04N 5/32; H04N 13/282; H04N 5/772; H04N 7/181; H04N 9/8042; H04N 5/76; G01V 3/12; G01V 3/081; G01V 5/22; G01V 8/10; G01V 8/005; G05B 19/4155; G05B 2219/45103

See application file for complete search history.

(56) References Cited

U.S. PATENT DOCUMENTS

| | | | |
|---|---|---|---|
| 2008/0266172 A1 | 10/2008 | Reinpoldt | |
| 2008/0298640 A1* | 12/2008 | Reinpoldt III | G06V 20/52 |
| | | | 382/107 |
| 2009/0060272 A1* | 3/2009 | Reinpoldt, III | G06T 11/60 |
| | | | 382/103 |
| 2014/0028457 A1* | 1/2014 | Reinpoldt | G08B 13/2494 |
| | | | 340/552 |
| 2015/0310713 A1* | 10/2015 | Kellermann | G08B 15/007 |
| | | | 340/541 |
| 2016/0232769 A1 | 8/2016 | Jarvi et al. | |
| 2016/0350583 A1 | 12/2016 | Nishino | |
| 2017/0365118 A1* | 12/2017 | Nurbegovic | G01V 5/20 |
| 2019/0072663 A1* | 3/2019 | Kuznetsov | H01Q 13/06 |
| 2019/0259791 A1* | 8/2019 | Itsuji | H01L 27/14605 |
| 2019/0391531 A1* | 12/2019 | Qi | G03H 1/0443 |

FOREIGN PATENT DOCUMENTS

| | | |
|---|---|---|
| JP | 2017-537399 A | 12/2017 |
| JP | 2018-146250 A | 9/2018 |
| JP | 2018-146257 A | 9/2018 |
| JP | 6588148 B | 10/2019 |
| WO | 2015/111312 A1 | 7/2015 |
| WO | 2017/085755 A1 | 5/2017 |

OTHER PUBLICATIONS

Future Vision Study Group for Airport Security, "Prescription for Widely Establishing Advanced Airport Security in Japan—Future Vision Study Group for Airport Security Survey Report Summary Version", [online], Jul. 18, 2017, [Searched on Sep. 18, 2019], the Internet <URL: https://www.nttdata-strategy.com/aboutus/newsrelease/170718/report.pdf>, pp. 1-8.

Extended European Search Report for EP Application No. 19949651.4, dated on Sep. 19, 2022.

* cited by examiner

FIG. 3

FIRST LIST

| SERIAL NUMBER | PERSON IMAGE | FEATURE VALUE | TRANSMISSION IMAGE | DETECTION DATE AND TIME | BELONGINGS | ... |
|---|---|---|---|---|---|---|
| 10001 | ***** | *** | *** | 2019.09.18.13:00 | KNIFE | ... |
| 10002 | ***** | *** | *** | 2019.09.18.13:15 | SCISSORS | ... |
| .... | .... | .... | .... | .... | .... | .... |

FIG. 4

LOG

| SERIAL NUMBER | PERSON IMAGE | FEATURE VALUE | TRANSMISSION IMAGE | DETECTION DATE AND TIME | INSPECTION RESULT | BELONGINGS | ... |
|---|---|---|---|---|---|---|---|
| 20001 | ***** | *** | *** | 2019.09.18.13:00 | NG | KNIFE | ... |
| 20002 | ***** | *** | *** | 2019.09.18.13:07 | O.K. | — | ... |
| 20003 | ***** | *** | *** | 2019.09.18.13:15 | NG | SCISSORS | ... |
| .... | .... | .... | .... | .... | .... | .... | .... |

FIG. 5

SECOND LIST

| SERIAL NUMBER | NAME | FACE IMAGE | VISIT FLAG | PERSON IMAGE | FEATURE VALUE | TRANS- MISSION IMAGE | DETECTION DATE AND TIME | INSPEC- TION RESULT | BELON- GINGS | ... |
|---|---|---|---|---|---|---|---|---|---|---|
| 30001 | TAROU YAMADA | *** | ✓ | ***** | *** | *** | 2019.09.18.13:00 | NG | KNIFE | ... |
| 30002 | HANAKO NAGANO | *** | | | | | | | | ... |
| 30003 | ICHIRO KAGAWA | *** | ✓ | ***** | *** | *** | 2019.09.18.13:07 | O.K. | — | ... |
| .... | ... | .... | .... | .... | .... | .... | .... | .... | .... | .... |

FIG. 9

WHITE LIST

| NAME | FACE IMAGE | .... |
|---|---|---|
| JIRO TAKAMATSU | *** | |
| ⋮ | ⋮ | ⋮ |

FIG. 10

WHITE LIST

| NAME | FACE IMAGE | OBJECT PERMITTED TO BE POSSESSED | · · · · |
|---|---|---|---|
| JIRO TAKAMATSU | *** | SCISSORS | · · · · |
| ⋮ | ⋮ | ⋮ | ⋮ |

FIG. 23
Side View
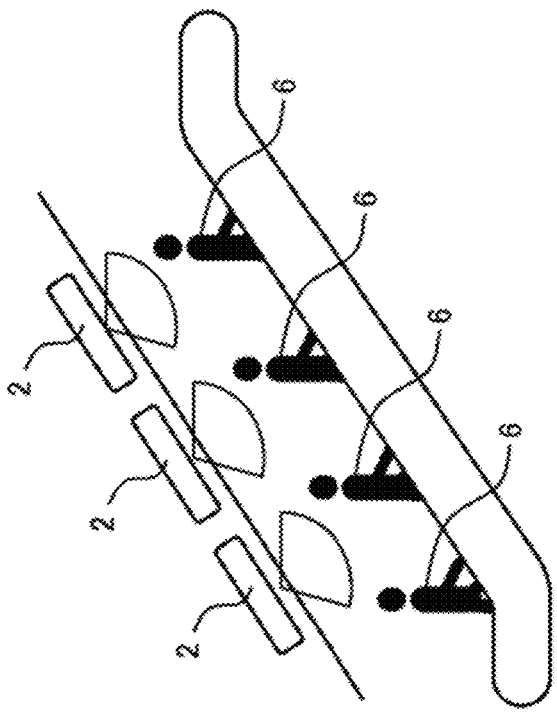
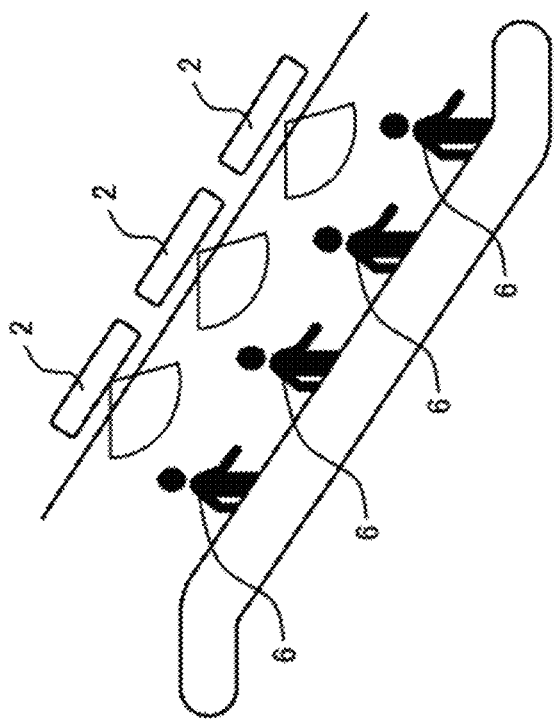

PROCESSING APPARATUS, PROCESSING METHOD, AND NON-TRANSITORY STORAGE MEDIUM

This application is a National Stage Entry of PCT/JP2019/041975 filed on Oct. 25, 2019, the contents of all of which are incorporated herein by reference, in their entirety.

TECHNICAL FIELD

The present invention relates to a processing apparatus, a processing method, and a program.

BACKGROUND ART

An increase in city crimes, terroristic threats, and the like increases importance of enhancing security for facilities where people gather.

Non-Patent Document 1 discloses, for security enhancement, marking and tracking a suspicious person, detecting a suspicious object by a microwave radar, identifying a person by face recognition, inspecting belongings by a transmission image, and the like.

Patent Document 1 discloses that belongings of a passenger are inspected by using various techniques such as a metal detector and an X ray image, opening and closing of a gate is controlled according to the inspection result, and a traveling direction of the passenger is controlled.

Patent Document 2 discloses that, when an intruder is detected by a millimeter wave sensor, a visual line of a monitor camera is directed to a detection position of the intruder, and a zoom image of the intruder is acquired.

Related Document

Patent Document

[Patent Document 1] Japanese Patent Application Publication (Translation of PCT Application) No. 2017-537399
[Patent Document 2] Japanese Patent Application Publication No. 2005-45712

Non-Patent Document

[Non-Patent Document 1] "Prescription for Widely Establishing "Advanced Airport Security" in Japan-Future Vision Study Group for Airport Security Survey Report Summary Version", [online], Jul. 18, 2017, Future Vision Study Group for Airport Security, [Searched on Sep. 18, 2019], the Internet <URL: https://www.nttdata-strategy.com/aboutus/newsrelease/170718/report.pdf>

DISCLOSURE OF THE INVENTION

Technical Problem

Inspecting belongings by using a transmission image and the like enables detecting a person who possesses a dangerous object such as a pistol or an edged tool. However, in a case of a positive inspection in which persons enter an inspection apparatus one by one and are inspected as in the related art, processing efficiency and convenience are poor. An object of the present invention is to improve processing efficiency and convenience of belongings inspection.

Solution to Problem

The present invention provides a processing system including: an image capturing means that captures an image of a person passing through a first area and generates a person image indicating an appearance of the person; an electromagnetic wave transmission/reception means that emits an electromagnetic wave having a wavelength of 30 micrometers or more and 1 meter or less toward the person passing through the first area, and receives a reflected wave; a determination means that determines whether the person possesses a pre-designated object, based on a signal of the received reflected wave; and a registration means that registers, in a first list, the person image of the person determined to possess the pre-designated object.

Furthermore, the present invention provides a processing method including, by a processing system: capturing an image of a person passing through a first area and generating a person image indicating an appearance of the person; emitting an electromagnetic wave having a wavelength of 30 micrometers or more and 1 meter or less toward the person passing through the first area, and receiving a reflected wave; determining whether the person possesses a pre-designated object, based on a signal of the received reflected wave; and registering, in a first list, the person image of the person determined to possess the pre-designated object.

Furthermore, the present invention provides a program that causes a computer of a processing system to function as: an image capturing means that captures an image of a person passing through a first area and generates a person image indicating an appearance of the person; a determination means that determines whether the person possesses a pre-designated object, based on a signal of a reflected wave of an electromagnetic wave having a wavelength of 30 micrometers or more and 1 meter or less and being emitted toward the person passing through the first area; and a registration means that registers, in a first list, the person image indicating an appearance of the person determined to possess the pre-designated object and being generated by capturing an image of the person passing through the first area.

Advantageous Effects of Invention

According to the present invention, processing efficiency and convenience of belongings inspection are improved.

BRIEF DESCRIPTION OF THE DRAWINGS

The aforementioned object, other objects, features and advantages are further apparent from the preferred example embodiments described below and the accompanying drawings as follows.

FIG. 3 is a diagram schematically illustrating an example of information processed by a processing system of the present example embodiment.

FIG. 4 is a diagram schematically illustrating an example of information processed by a processing system of the present example embodiment.

FIG. 5 is a diagram schematically illustrating an example of information processed by a processing system of the present example embodiment.

FIG. 9 is a diagram schematically illustrating an example of information processed by a processing system of the present example embodiment.

FIG. 10 is a diagram schematically illustrating an example of information processed by a processing system of the present example embodiment.

FIG. 23 is a diagram illustrating an arrangement example of a sensor panel.

DESCRIPTION OF EMBODIMENTS

First Example Embodiment

Figure 1:
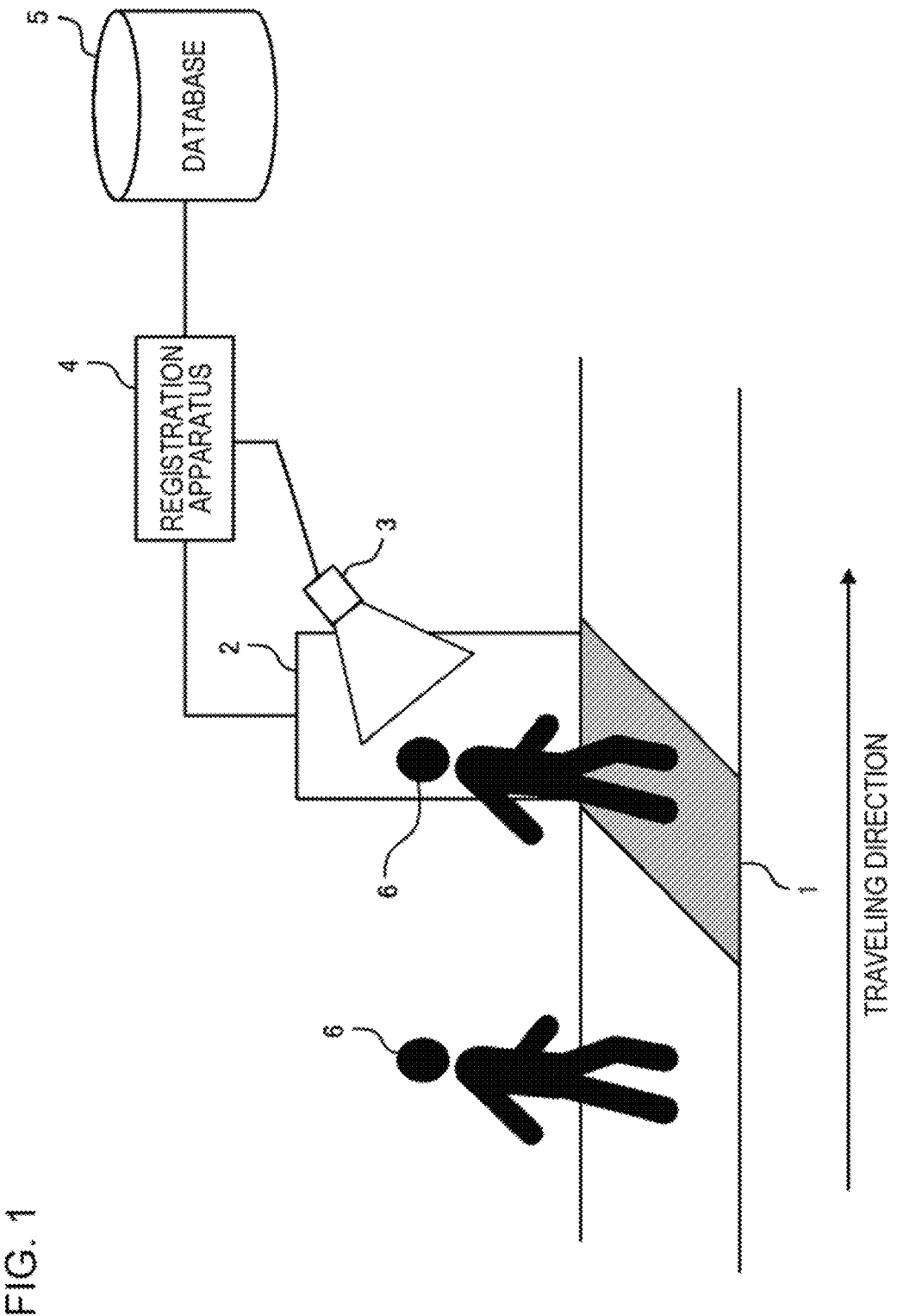
FIG. 1 is a conceptual diagram for explaining an overview of processing of a processing system of the present example embodiment.

First, an overview of a processing system of the present example embodiment will be described with reference to an example of FIG. 1. The processing system of the present example embodiment emits an electromagnetic wave having a wavelength of 30 micrometers or more and 1 meter or less toward persons 6 passing through a first area 1, and receives a reflected wave. In the case of the illustrated example, a sensor panel 2 emits the electromagnetic wave and receives the reflected wave. Then, a registration apparatus 4 determines whether the person 6 possesses a pre-designated object (for example, a dangerous object such as a pistol) on the basis of a signal of the reflected wave received by the sensor panel 2.

Furthermore, a camera 3 captures an image of the person 6 passing through the first area 1 in at least either before passing through the first area 1, during passing through the first area 1, or after passing through the first area 1, and generates a person image indicating the appearance of the person 6. Then, the registration apparatus 4 registers the person image of the person 6 determined to possess the pre-designated object, in a first list (black list) of a database 5.

In this way, the processing system of the present example embodiment performs walk-through type belongings inspection on the person 6 passing through the first area 1, and captures an image of the person 6 to generate a person image indicating the appearance of the person 6. Then, the processing system registers the person image of the person 6 determined to possess the pre-designated object, in the first list. According to such a processing system of the present example embodiment, processing efficiency and convenience of belongings inspection are improved.

Next, details of the configuration of a processing system 20 will be described in detail. FIG. 2 illustrates an example of a functional block diagram of the processing system 20. As illustrated in FIG. 2, the processing system 20 includes an image capturing unit 21, an electromagnetic wave transmission/reception unit 22, a determination unit 23, a registration unit 24, and a storage unit 25. In the case of the example of FIG. 1, the sensor panel 2 corresponds to the electromagnetic wave transmission/reception unit 22, the camera 3 corresponds to the image capturing unit 21, the registration apparatus 4 corresponds to the determination unit 23 and the registration unit 24, and the database 5 corresponds to the storage unit 25.

The electromagnetic wave transmission/reception unit 22 emits an electromagnetic wave (for example, a microwave, a millimeter wave, a terahertz wave, and the like) having a wavelength of 30 micrometers or more and 1 meter or less toward the persons 6 passing through the first area 1, and receives a reflected wave. The electromagnetic wave transmission/reception unit 22 is, for example, a radar. The electromagnetic wave transmission/reception unit 22 can be configured by adopting any technology. For example, the electromagnetic wave transmission/reception unit 22 may be the sensor panel 2 composed of a radar in which a plurality of antennas are arranged, as in the example of FIG. 1.

The determination unit 23 determines whether the person 6 passing through the first area 1 possesses a pre-designated object, on the basis of a signal of the reflected wave received by the electromagnetic wave transmission/reception unit 22. The "designation of an object" is, for example, designation of a category (type) such as "pistol" and "knife", and it is not necessary to designate a detailed type, model, and the like of each category. For example, according to a determination method using machine learning to be described below, it is possible to detect that even an unknown type or model in a designated object is possessed. Hereinafter, an example of the determination method by the determination unit 23 will be described, but this is merely an example and the present invention is not limited thereto.

For example, the determination unit 23 may generate a transmission image on the basis of the signal of the reflected wave received by the electromagnetic wave transmission/reception unit 22. Then, the determination unit 23 may determine whether the person 6 possesses the pre-designated object, on the basis of a shape appearing in the transmission image.

As an example of the determination method based on the shape appearing in the transmission image, the use of machine learning is conceivable. For example, an estimation model, in which a transmission image (training data) of a pre-designated object is prepared and an object appearing in the transmission image is estimated by machine learning based on the training data, may be generated. Then, the determination unit 23 may determine whether the pre-designated object is appearing in the transmission image, on the basis of the generated transmission image and estimation model. As another example, the determination unit 23 may search for a pre-designated object in a transmission image by template matching using a template indicating the shape of the pre-designated object.

Furthermore, the determination unit 23 may determine whether the person 6 possesses the pre-designated object, on the basis of a feature value (transmission feature value) appearing in the signal of the reflected wave received by the electromagnetic wave transmission/reception unit 22. That is, the determination unit 23 may perform the above determination by using the signal of the reflected wave as is without generating any transmission image. Even in such a case, an example using the estimation model based on the aforementioned machine learning or the use of an example using the template matching is conceivable.

The pre-designated object is an object that is not preferable to be possessed by the person 6 passing through the first area 1, and examples thereof include, but not limited to, a dangerous object such as a knife and a pistol.

When the electromagnetic wave transmission/reception unit 22 continuously transmits/receives an electromagnetic wave, the determination unit 23 can classify a signal of a reflected wave for each person 6 and determine whether each person 6 possesses a pre-designated object on the basis of the signal of the reflected wave of each person 6.

The following is conceivable as an example of the process of classifying a signal of a reflected wave for each person 6. First, features appearing in a signal of a reflected wave and a transmission image generated from the signal differ depending on when the person 6 exists in the first area 1 and when the person 6 does not exist in the first area 1. When the person 6 does not exist in the first area 1, for example, a reflected wave reflected by a facing wall is received by the electromagnetic wave transmission/reception unit 22. When the person 6 exists in the first area 1, for example, a reflected wave reflected by a wall and the person 6 is received by the electromagnetic wave transmission/reception unit 22.

For example, the electromagnetic wave transmission/reception unit 22 may transmit/receive an electromagnetic wave in advance in a state where no person exits in the first area 1, and a signal of a reflected wave received in such a state may be held as a reference signal. Then, the determination unit 23 may use the reference signal or a transmission image generated from the reference signal, and specify whether the signal of the reflected wave received by the electromagnetic wave transmission/reception unit 22 indicates a "state where the person 6 exists in the first area 1" or a "state where the person 6 does not exist in the first area 1". For example, the determination unit 23 may specify whether the signal of the reflected wave indicates which of the two states, on the basis of whether a difference between the signal of the reflected wave and the reference signal is equal to or more than a threshold or whether a difference between a transmission image generated from the signal of the reflected wave and a transmission image generated from the reference signal is equal to or more than a threshold.

In addition, the entry/exit of the person 6 to the first area 1 may be determined by using an optical image generated by another apparatus (sensor such as a camera) other than the aforementioned apparatus or sensor information from a human sensor and the like, so that the "timing (time period)" in which each person 6 exists in the first area 1" may be specified. On the basis of the specified "timing (time period)" in which each person 6 exists in the first area 1", the determination unit 23 may classify a signal of a reflected wave for each person 6.

On the basis of the specified result, the determination unit 23 can specify the timing when each person 6 has entered the first area 1 (timing when the state where the person 6 does not exist in the first area 1 has changed to the state where the person 6 exists in the first area 1) and the timing when each person 6 has exit the first area 1 (timing when the state where the person 6 exists in the first area 1 has changed to the state where the person 6 does not exist in the first area 1). On the basis of the specified result, the determination unit 23 can classify a signal of a reflected wave for each person 6. Specifically, the determination unit 23 can use the signal of the reflected wave from the "timing when a certain person 6 enters the first area 1" to the "timing when a certain person 6 exits the first area 1" that appears immediately after that, as data of one person 6.

The image capturing unit 21 captures an image of the person 6 passing through the first area 1 and generates a person image indicating the appearance (including a face) of the person 6. The image capturing unit 21 is a camera that receives light such as visible light and infrared light and generates an image. The image capturing unit 21 is installed at a position and an orientation, in which an image of the person 6 can be captured, at least at any timing before passing through the first area 1, after passing through the first area 1, and during passing through the first area 1. One image capturing unit 21 may be installed, or a plurality of image capturing units 21 may be installed.

The image capturing unit 21 may continuously capture a moving image, capture a still image at a predetermined capturing timing, or capture a moving image for a predetermined period of time from the predetermined capturing timing.

The predetermined capturing timing can be a timing when the person 6 has been detected at a predetermined position. The predetermined position may be a position in the first area 1, any position in a capturing area (view area) of the camera 3, a position immediately before the capturing area (view area) of the camera 3 or the first area 1 (immediately before being directed to the traveling direction), or other positions.

The above capturing timing may be determined, for example, on the basis of the signal of the reflected wave received by the electromagnetic wave transmission/reception unit 22. That is, on the basis of the signal of the reflected wave received by the electromagnetic wave transmission/reception unit 22, it may be detected that the person 6 has entered the first area 1 (capturing timing). A means for detecting that the person 6 has entered the first area 1 on the basis of the signal of the reflected wave received by the electromagnetic wave transmission/reception unit 22 is as described above. Furthermore, the above capturing timing may be determined on the basis of a signal sensed by another sensor. For example, the person 6 may be detected at a predetermined position by a human sensor installed at the predetermined position.

The registration unit 24 registers, in the first list, the person image of the person 6 determined by the determination unit 23 to possess the pre-designated object. The storage unit 25 stores the first list.

FIG. 3 schematically illustrates an example of the first list. In the case of the illustrated example, information (serial number) for identifying persons 6 registered in the first list, person images generated by the image capturing unit 21, feature values indicating the features of appearance of the persons 6 extracted from the person images, transmission images generated related to the persons 6, date and time (detection date and time) when the persons 6 have been detected in the first area 1, and the type of pre-designated objects (belongings) determined to be possessed by the persons 6 are registered in association with one another. The first list may not include information on some items in illustrated example, or may include information on other items.

The registration unit 24 may also register the person images generated by the image capturing unit 21 and the determination result of the determination unit 23 in a log in association with each other. In the log, the person images of all persons 6 who have passed through the first area 1 and the determination result of the determination unit 23 are registered. The storage unit 25 can store the log.

FIG. 4 schematically illustrates an example of the log. In the case of the illustrated example, information (serial number) for identifying a plurality of logs from each other, the person images generated by the image capturing unit 21, the feature values indicating the features of the appearance of the persons 6 extracted from the person images, the transmission images generated related to the persons 6, the date and time (detection date and time) when the persons 6 have been detected in the first area 1, the determination result of the determination unit 23, and names of the pre-designated objects (belongings) determined to be possessed by the persons 6 are registered in association with one another. The log may not include information on some items in illustrated example, or may include information on other items.

The registration unit 24 may also register the person images generated by the image capturing unit 21 and the determination result of the determination unit 23 in a pre-generated second list in association with each other. The second list may be, for example, a list of prospective visitors, a blacklist of persons requiring special attention, or others. The storage unit 25 can store the second list.

FIG. 5 schematically illustrates an example of the second list. In the case of the illustrated example, information (serial number) for identifying the persons 6 registered in the second list from each other, names, and face images are registered in advance. Other information is registered on the basis of information generated by the image capturing unit 21, the electromagnetic wave transmission/reception unit 22, and the determination unit 23.

In the case of the illustrated example, as other information, visit flags indicating whether persons 6 have visited, the person images generated by the image capturing unit 21, the feature values indicating the features of the appearance of the persons 6 extracted from the person images, the transmission images generated related to the persons 6, the date and time (detection date and time) when the persons 6 have been detected in the first area 1, the determination result of the determination unit 23, and the names of the pre-designated objects (belongings) determined to be possessed by the persons 6 are registered in association with one another. The second list may not include information on some items in illustrated example, or may include information on other items.

The registration unit 24 can specify which person 6 in the second list is the person 6 detected in the first area 1, by collating the face images registered in the second list in advance with the person images generated by the image capturing unit 21.

A means for associating the person images generated by the image capturing unit 21 and the determination result of the determination unit 23 with each other in relation to the same person 6 is not particularly limited. For example, the person images and the determination result of the determination unit 23 may be assigned time stamps. On the basis of the time stamps, the registration unit 24 may associate the person images regarding the same person 6 and the determination result of the determination unit 23 with each other. The association may also be implemented by other means.

Figure 6:
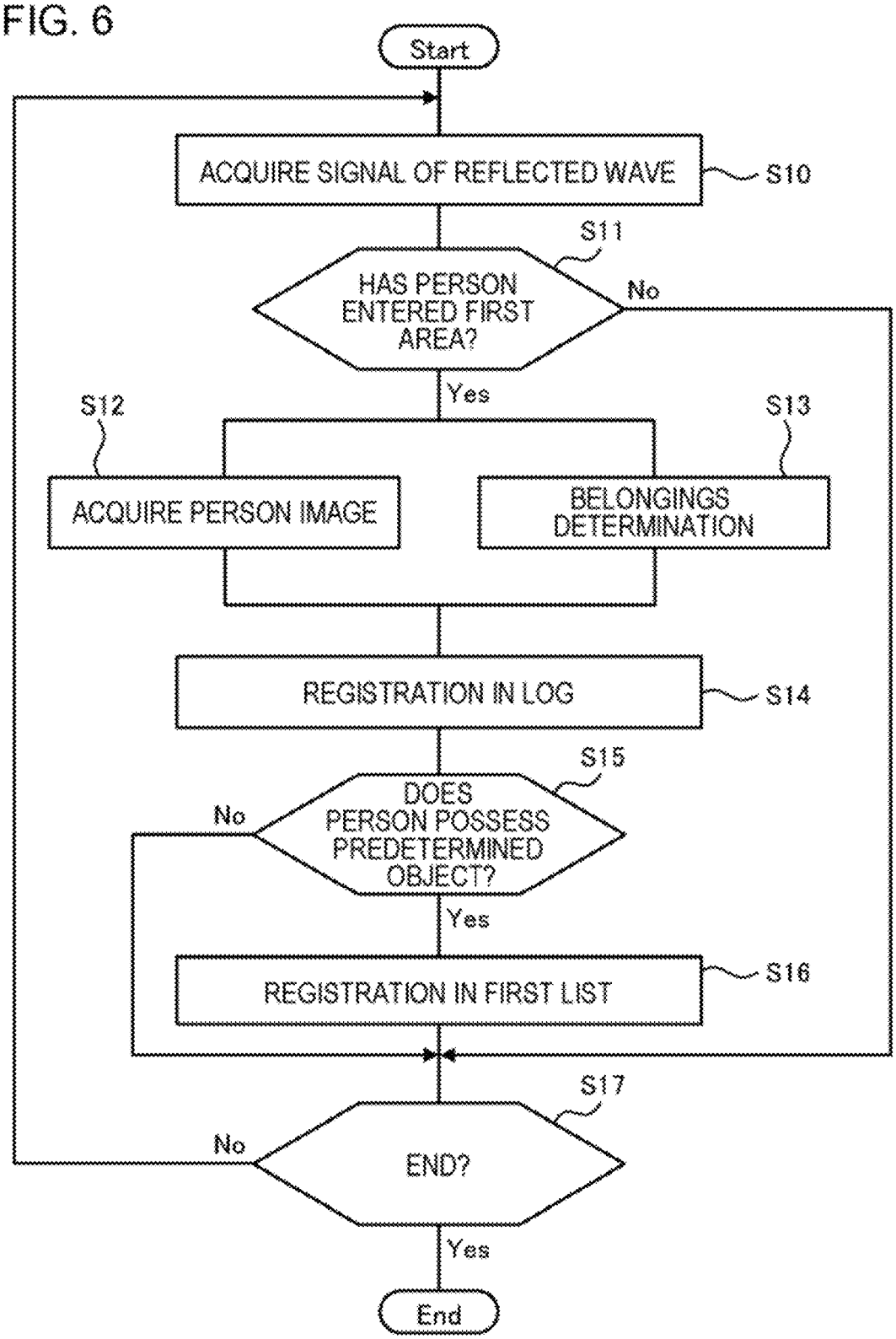
FIG. 6 is a flowchart illustrating an example of a processing flow of a processing system of the present example embodiment.

Next, an example of a processing flow of the processing system 20 will be described with reference to a flowchart of FIG. 6. The processing flow to be described below is merely an example and can be appropriately modified on the basis of the configuration of the aforementioned each functional unit.

When the processing is started, the electromagnetic wave transmission/reception unit 22 repeats the emission of an electromagnetic wave having a wavelength of 30 micrometers or more and 1 meter or less and the reception of a reflected wave at predetermined intervals. Then, when a signal of the reflected wave is achieved from the electromagnetic wave transmission/reception unit 22 (S10), the determination unit 23 determines whether a person 6 has entered the first area 1 on the basis of the signal (S11). Since the details of the determination process are as described above, description thereof will be omitted.

When it is determined that the person 6 has not entered the first area 1 (No at S11), the determination unit 23 waits for the acquisition of a signal of a next reflected wave unless there is an instruction to end the processing (No at S17).

On the other hand, when it is determined that the person 6 has entered the first area 1 (Yes at S11), the determination unit 23 determines on the basis of the signal of the reflected wave whether the person 6 who has entered the first area 1 possesses a pre-designated object, and inputs the determination result to the registration unit 24 (S13). Since the details of the determination process are as described above, description thereof will be omitted.

When it is determined that the person 6 has entered the first area 1 (Yes at S11), the determination unit 23 notifies the registration unit 24 that the person 6 has entered the first area 1. The registration unit 24 acquires a person image from the image capturing unit 21 in response to the notification (S12).

For example, the image capturing unit 21 may continuously capture a moving image. Then, the registration unit 24 may request a person image from the image capturing unit 21 in response to the above notification, and the image capturing unit 21 may return, to the registration unit 24, a person image generated at the timing of the request or immediately before or immediately after the request.

In addition, the image capturing unit 21 may be configured to capture a still image at a predetermined capturing timing, or capture a moving image for a predetermined period of time from the predetermined capturing timing. When it is determined that the person 6 has entered the first area 1 (Yes at S11), the determination unit 23 may notify the image capturing unit 21 that the person 6 has entered the first area 1. The image capturing unit 21 may capture a still image, or capture a moving image for a predetermined period of time in response to the notification, and input a generated image to the registration unit 24.

Thereafter, the registration unit 24 registers the acquired person image and the determination result of the determination unit 23 in the log (see FIG. 4) in association with each other (S14).

Next, when the registered determination result indicates "the person 6 possesses a pre-designated object" (Yes at S15), the registration unit 24 registers the acquired person image in the first list (see FIG. 3) (S16). On the other hand, when the registered determination result indicates "the person 6 possesses no pre-designated object" (No at S15), the registration unit 24 does not register the acquired person image in the first list (see FIG. 3).

Figure 7:
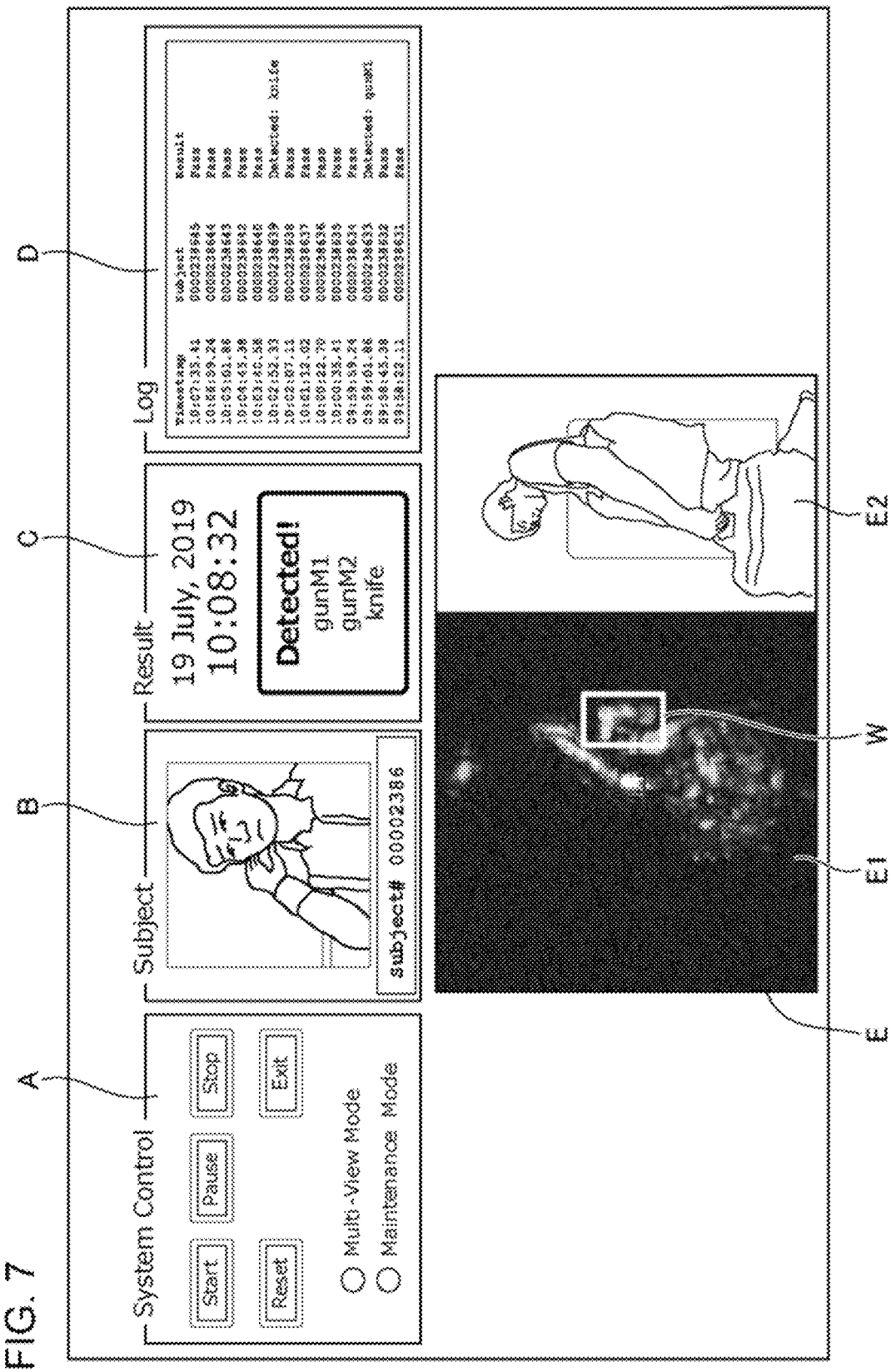
FIG. 7 is a diagram illustrating an example of a screen output by a processing system of the present example embodiment.

Next, FIG. 7 illustrates an example of a screen output by the processing system 20. Although the illustrated screen includes all of areas A to E, the screen output by the processing system 20 may include at least a part of the areas A to E.

In the area B, a person image of a person 6 newly detected in the first area 1 (person image generated by the capturing unit 21) is displayed. In the area C, the determination result of the determination unit 23 regarding the person 6 and the detection date and time are displayed.

In the area E, the person image and the transmission image of the person 6 are displayed. As in the example, at least one of a plurality of image capturing units 21 may capture an image of the person 6 from the same direction as the emission direction in which the electromagnetic wave transmission/reception unit 22 emits an electromagnetic wave (so that an optical axis is substantially parallel). Then, a person image E2 and a transmission image E1 observed from the same direction may be displayed side by side. As in the illustrated example, the position of a detected pre-designated object in the image may be clearly indicated by a frame W and the like.

In the area A, various UI components are displayed. For example, the person image displayed in the area B and/or the area E may be a part (one frame image) of a dynamic image generated by the image capturing unit 21. Then, the playback, stop, pause, and the like of the dynamic image may be instructed via the UI components displayed in the area A.

In the area D, the logs (see FIG. 4) stored in the storage unit 25 is displayed. The processing system 20 may accept user input for selecting one from the logs displayed in the area D. In the area B, the area C, and the area E, information on the selected log may be displayed instead of information on the person 6 newly detected in the first area 1.

Next, an example of the hardware configuration of the processing system 20 will be described. Each functional unit included in the processing system 20 is implemented by an arbitrary combination of hardware and software centering on a central processing unit (CPU) of an arbitrary computer, a memory, a program loaded on the memory, a storage unit such as a hard disk for storing the program (can store programs downloaded from a storage unit such as a compact disc (CD), a server on the Internet, and the like in addition to programs stored in advance from the shipping stage of an apparatus), and a network connection interface. It is understood by a person skilled in the art that there are various modifications in the implementation method and apparatus.

Figure 8:
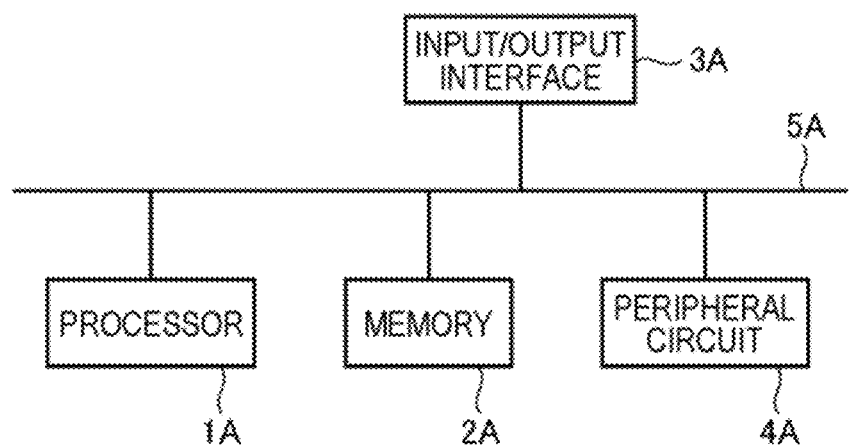
FIG. 8 is an example of the hardware configuration of a processing system of the present example embodiment.

FIG. 8 is a block diagram illustrating an example of the hardware configuration of the processing system 20. As illustrated in FIG. 8, the processing system 20 includes a processor 1A, a memory 2A, an input/output interface 3A, a peripheral circuit 4A, and a bus 5A. The peripheral circuit 4A includes various modules. The processing system 20 may not include the peripheral circuit 4A. The processing system 20 may be composed of a plurality of physically and/or logically separated apparatuses, or may be composed of one physically and/or logically integrated apparatus. When the processing system 20 is composed of a plurality of physically and/or logically separated apparatuses, each of the plurality of apparatuses may include the above hardware configuration.

The bus 5A is a data transmission path through which the processor 1A, the memory 2A, the peripheral circuit 4A, and the input/output interface 3A transmit/receive data to/from one another. The processor 1A is, for example, an arithmetic processing unit such as a CPU and a graphics processing unit (GPU). The memory 2A is, for example, a memory such as a random access memory (RAM) and a read only memory (ROM). The input/output interface 3A includes an interface for acquiring information from an input device, an external device, an external server, an external sensor, a camera, and the like, an interface for outputting information to an output device, an external device, an external server, and the like, and the like. The input device is, for example, a keyboard, a mouse, a microphone, a physical button, a touch panel, and the like. The output device is, for example, a display, a speaker, a printer, a mailer, and the like. The processor 1A can output a command to each module and perform a calculation based on the calculation result thereof.

Next, an advantageous effect of the processing system 20 of the present example embodiment will be described. The processing system 20 of the present example embodiment performs walk-through type belongings inspection on a person 6 passing through the first area 1, and captures an image of the person 6 to generate a person image indicating the appearance of the person 6. Then, the processing system 20 registers the person image of the person 6 determined to possess a pre-designated object, in the first list. According to such a processing system of the present example embodiment, it is possible to inspect belongings without being conscious of any person 6. As a consequence, processing efficiency and convenience of the belongings inspection are improved. Furthermore, as the processing efficiency and convenience are improved, it is possible to perform inspection even in a soft target area where a plurality of persons 6 can enter, without requiring authentication and the like for entry.

Furthermore, the first list in which the person 6 determined to possess the pre-designated object is registered is generated, so that various processes for enhancing security for a facility can be performed by using the list after the inspection. Various processes for enhancing security for the facility can be performed by using the first list after the inspection, so that it is less necessary to secure the identity of the person 6 at the time of inspection. As a consequence, it is less necessary to allow a security guard and the like to stay in an inspection place, thereby acquiring an effect of reduction of labor costs, and the like. Specific examples of various processes will be described in the following example embodiments.

Furthermore, according to the processing system 20 of the present example embodiment, the person image and the determination result of the determination unit 23 can be registered in the log in association with each other. Therefore, it is possible to confirm the determination result of the determination unit 23 regarding each of a plurality of persons 6 who have visited a facility.

Furthermore, according to the processing system 20 of the present example embodiment, the transmission image and details (inspection result, belongings, and the like) of the determination result of the determination unit 23 can be associated with each other in the first list, the log, and the like. Therefore, it is possible to quickly access the transmission image of each person 6 and the details of the determination result of the determination unit 23 from the first list and the log. As a consequence, for example, a worker can access the transmission image of each person 6 and the details of the determination result of the determination unit 23 from the first list and the log, and confirm whether the registered determination result is correct.

Hereinafter, modifications of the processing system 20 of the present example embodiment will be described. The processing system 20 may determine whether a person 6 possesses a pre-designated object by using another apparatus such as an explosive detector, and register the determination result. Even in such a case, the same advantageous effect is implemented.

Figure 2:
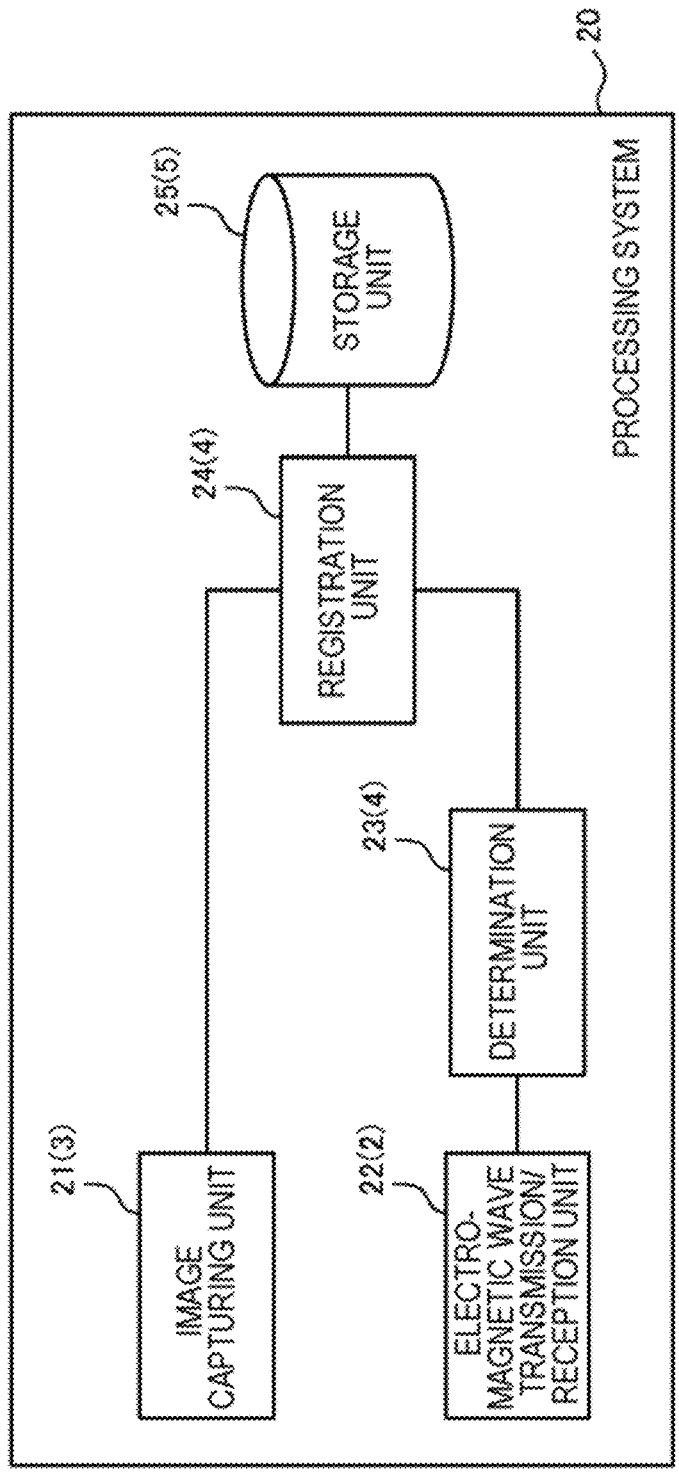
FIG. 2 is an example of a functional block diagram of a processing system of the present example embodiment.
Figure 19:
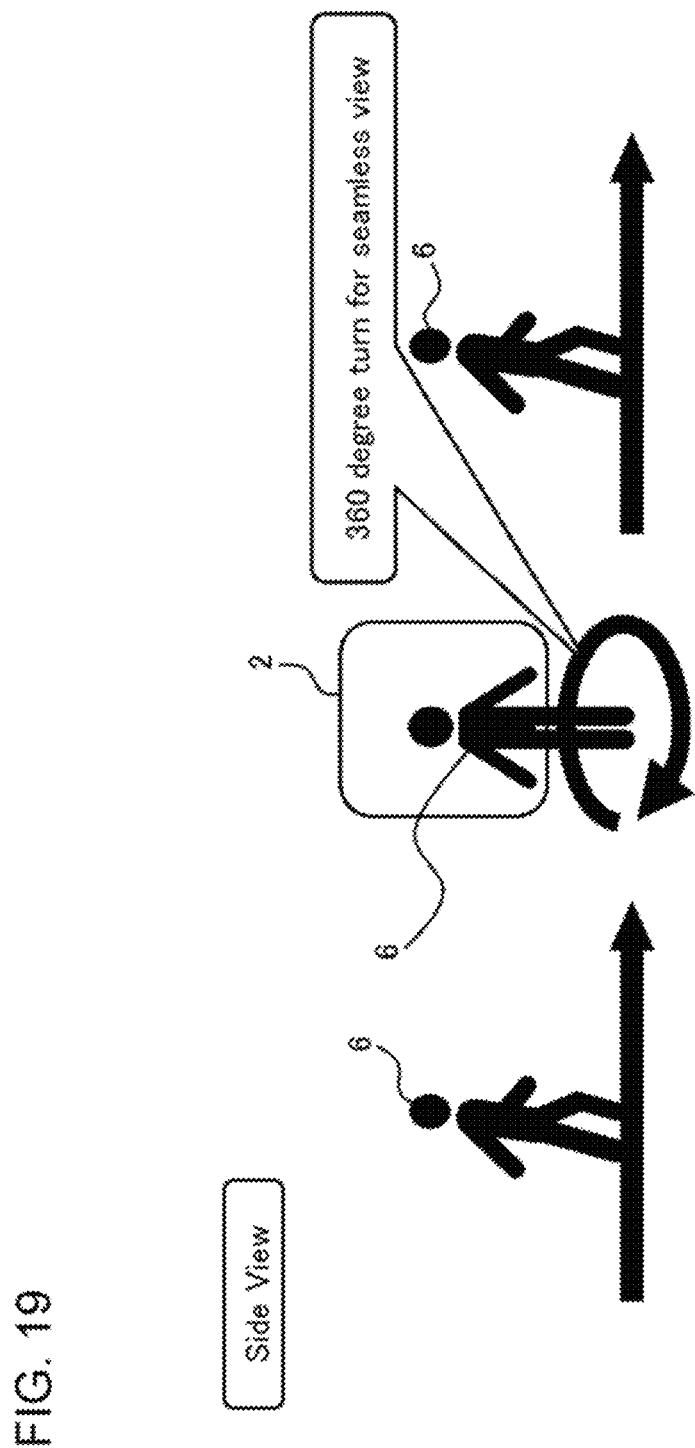
FIG. 19 is a diagram illustrating an arrangement example of a sensor panel.
Figure 20:
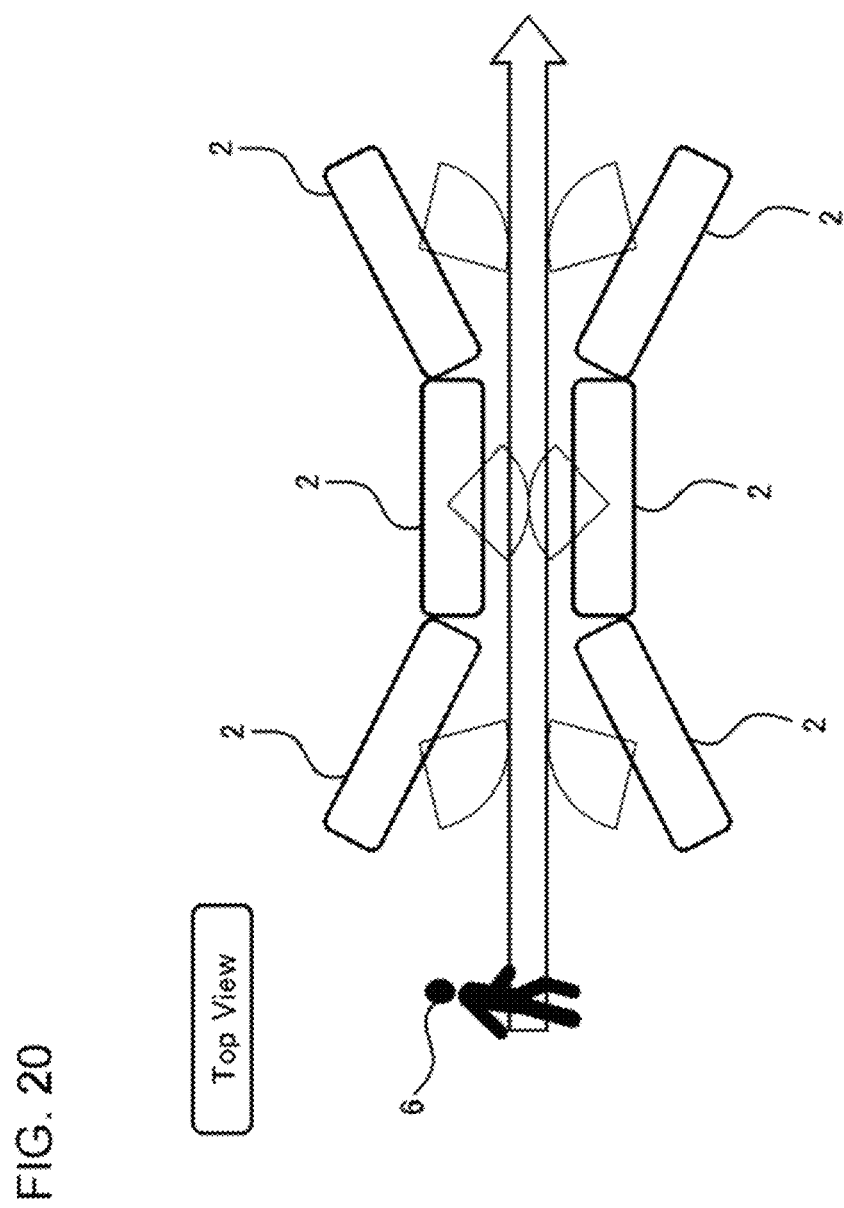
FIG. 20 is a diagram illustrating an arrangement example of a sensor panel.
Figure 21:
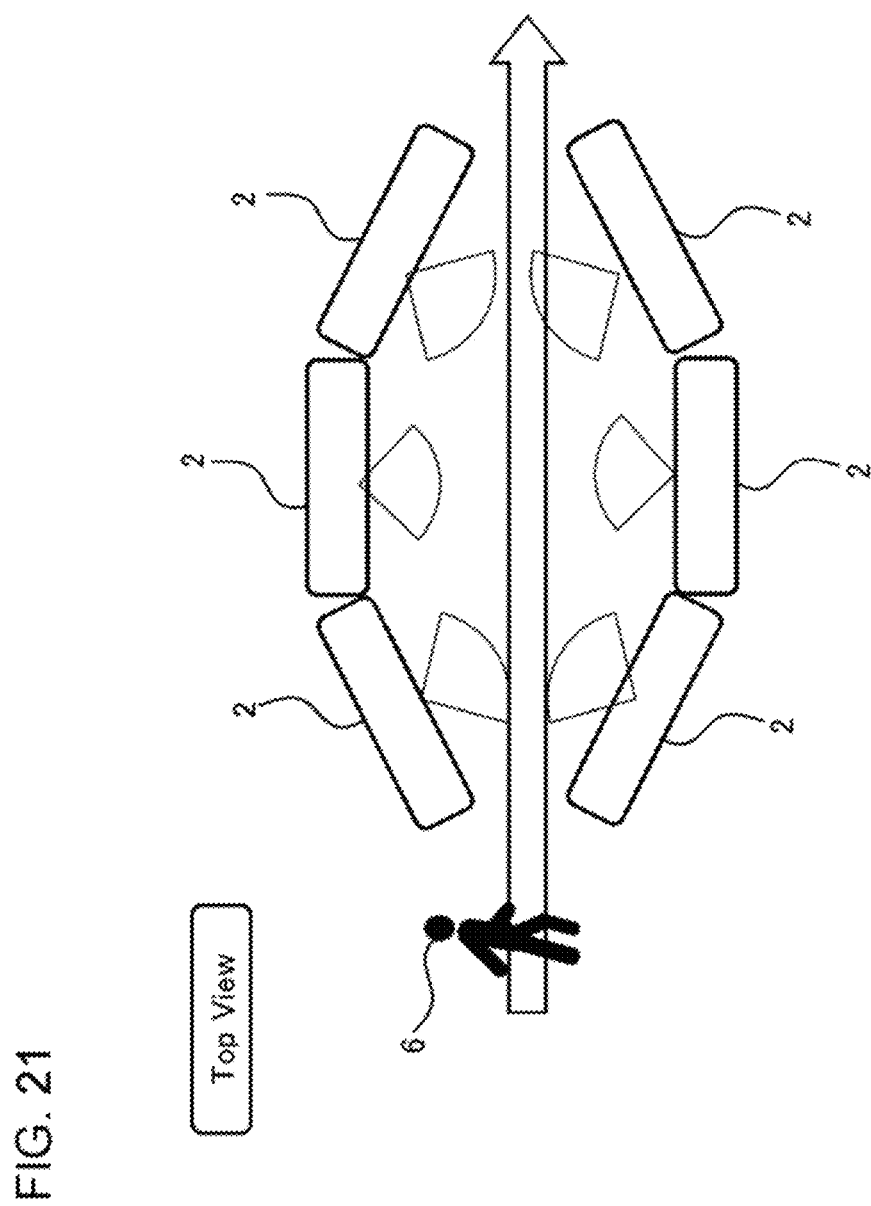
FIG. 21 is a diagram illustrating an arrangement example of a sensor panel.
Figure 22:
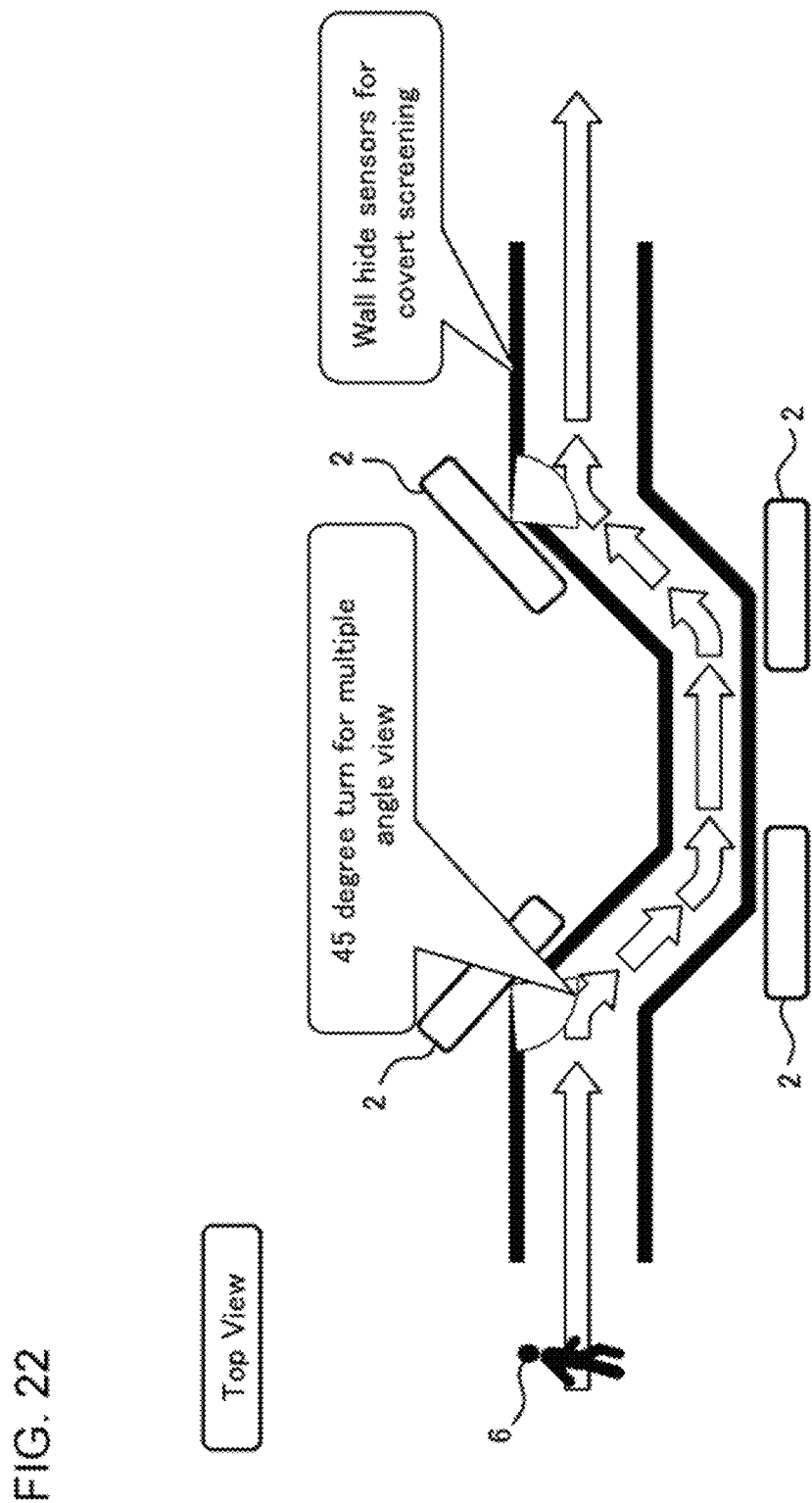
FIG. 22 is a diagram illustrating an arrangement example of a sensor panel.
Figure 24:
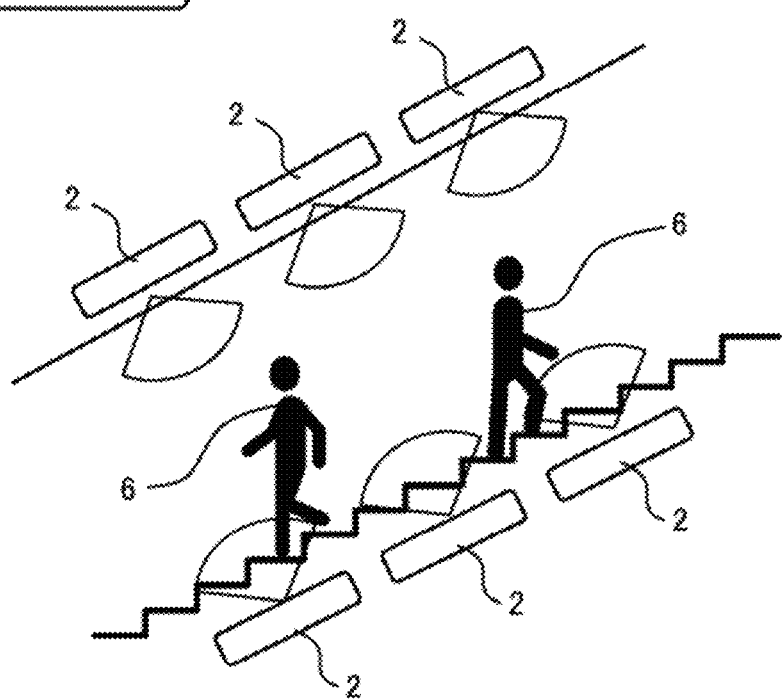
FIG. 24 is a diagram illustrating an arrangement example of a sensor panel.

Furthermore, the method of the arrangement of the sensor panel 2 illustrated in FIG. 1 is merely an example, and the present invention is not limited thereto. For example, the sensor panel 2 may be arranged to have a predetermined angle with respect to the traveling direction, a plurality of sensor panels 2 may be arranged, or other arrangement methods may be adopted. FIG. 19 to FIG. 24 illustrate examples of the arrangement method of the sensor panel 2. In the example of FIG. 19, one sensor panel 2 is arranged and a person 6 is turned in front of the sensor panel 2. In the examples of FIG. 20 and FIG. 21, a plurality of sensor panels 2 are arranged to interpose a position, where the person 6 passes, therebetween. In the example of FIG. 22, a plurality of sensor panels 2 are arranged at curved positions of a passage in which a person 6 is turned by a predetermined angle for direction change. FIG. 23 is an example in which sensor panels 2 are installed above an escalator, stairs, and the like. For example, the sensor panels 2 can be installed behind a ceiling having an angle with respect to a horizontal direction as illustrated in the drawing. FIG. 24 is an example in which sensor panels 2 are installed above and below stairs and the like. For example, the sensor panels 2 can be installed behind a ceiling having an angle with respect to a horizontal direction as illustrated in the drawing. Furthermore, the sensor panels 2 may be embedded in the stairs. Even in the modifications, the same advantageous effect is implemented.

Second Example Embodiment

A processing system 20 of the present example embodiment is different from the first example embodiment in that, when a person 6 determined to possess a pre-designated object and having a person image registered in the first list has been registered in a white list generated in advance, the processing system 20 has a function of deleting the person image of the person 6 from the first list.

An example of the functional block diagram of the processing system 20 is illustrated in FIG. 2, as in the first example embodiment.

When the person 6 registered in the first list has been registered in the white list generated in advance, the registration unit 24 deletes the person image of the person 6 from the first list. The storage unit 25 stores the white list.

Figure 9:
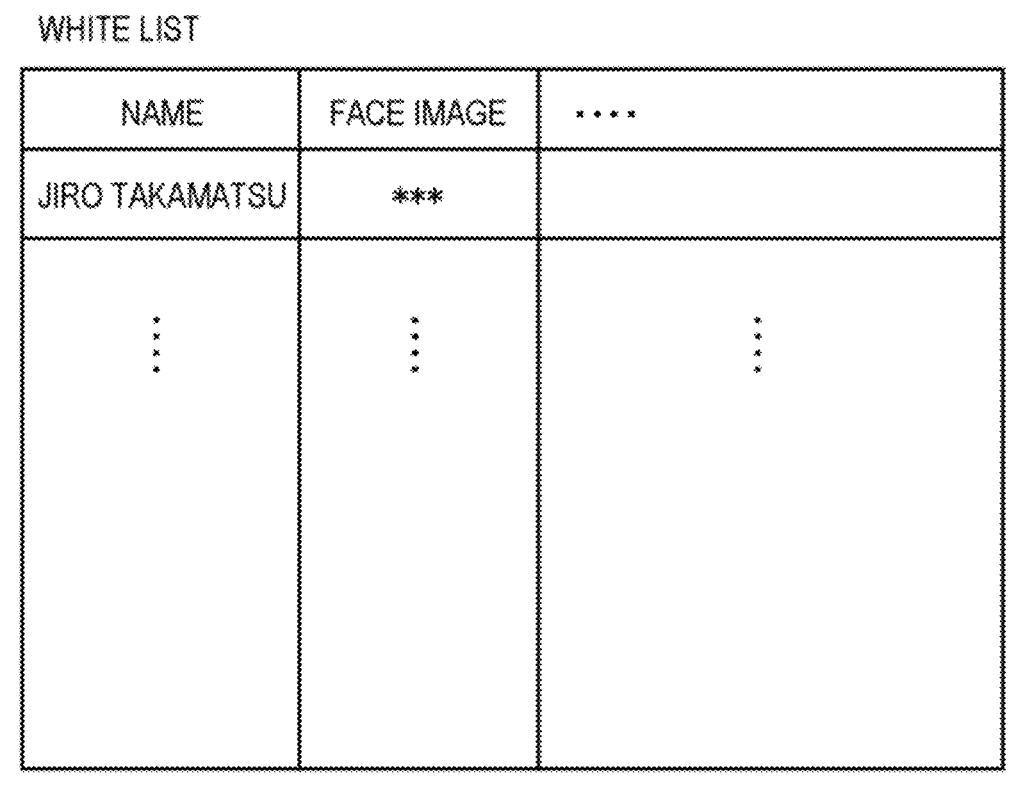

FIG. 9 schematically illustrates an example of the white list. In the illustrated example, names and face images of persons 6 have been registered in the white list. The registration unit 24 can determine whether the person 6 registered in the first list has been registered in the white list, by collating the face images registered in the white list in advance with the person images generated by the image capturing unit 21.

FIG. 10 schematically illustrates another example of the white list. In the illustrated example, names and face images of persons 6 and names of objects permitted to be possessed have been registered in the white list. In the case of the example, when the person 6 registered in the first list has been registered in the white list and an object determined to be possessed by the person 6 is an object permitted to be possessed, the registration unit 24 deletes the person image of the person 6 from the first list. That is, even though the person 6 registered in the first list has been registered in the white list, when the object determined to be possessed by the person 6 is an object not permitted to be possessed, the registration unit 24 does not delete the person image of the person 6 from the first list.

The white list may include information on other items such as feature values extracted from face images, contact information (addresses and phone numbers), information indicating belonging destinations, and the like.

The other configurations of the processing system 20 are the same as those of the first example embodiment.

According to the processing system 20 of the present example embodiment described above, the same advantageous effect as the processing system 20 of the first example embodiment can be implemented.

Furthermore, according to the processing system 20 of the present example embodiment, a person 6 registered in the white list can be deleted from the first list. For example, security guards, bodyguards, and the like who patrol a facility may possess a knife, a pistol, and the like for security. When such a person 6 is registered in the first list, is monitored, or activities of the person 6 are restricted in the facility, it is not preferable because a processing load of a computer is unnecessarily increased or the work of security guards and bodyguards are hindered. The processing system 20 of the present example embodiment can reduce such inconvenience.

Third Example Embodiment

Figure 11:
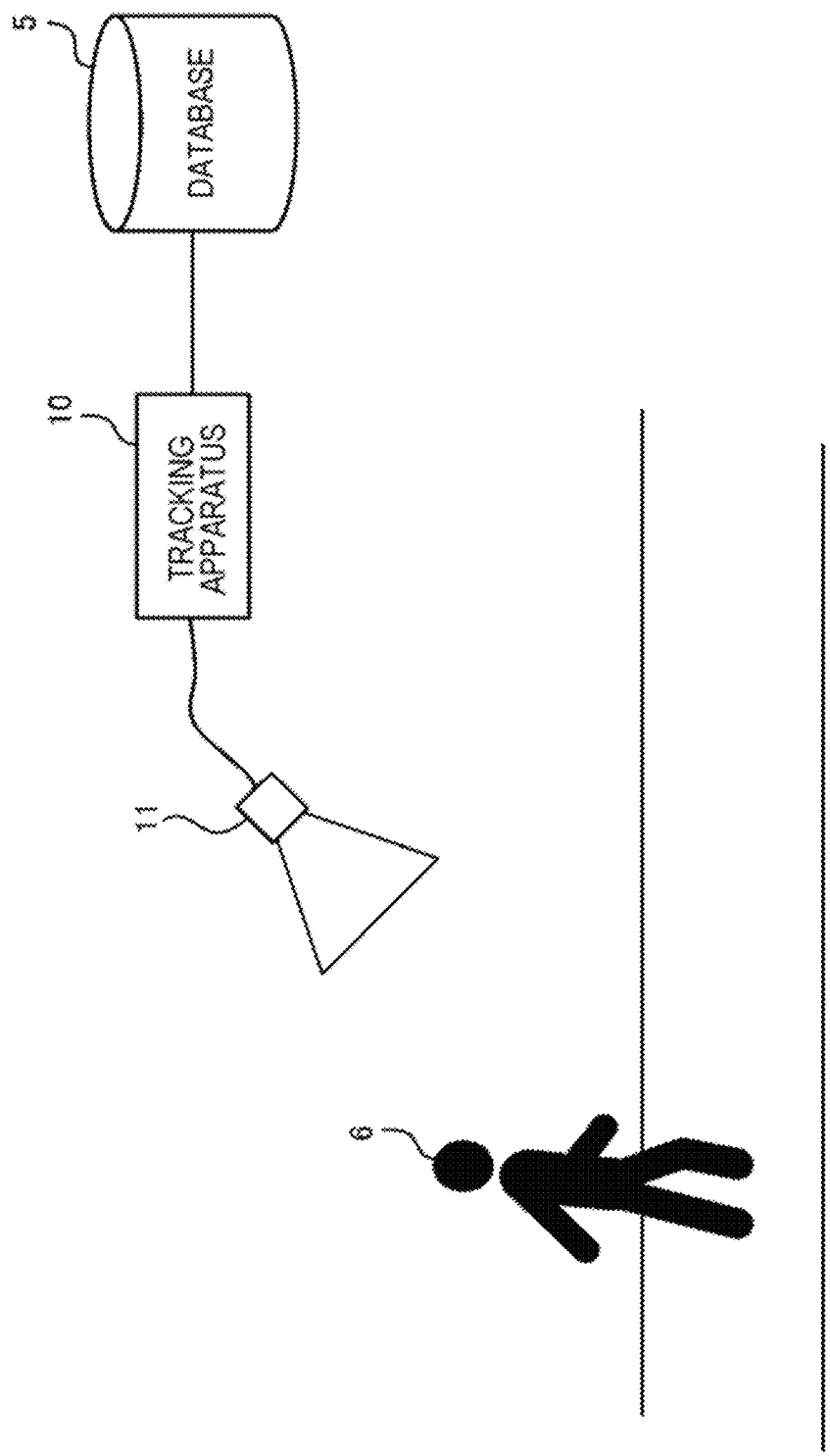
FIG. 11 is a conceptual diagram for explaining an overview of processing of a processing system of the present example embodiment.

A processing system 20 of the present example embodiment performs a process for improving security by using the aforementioned first list. Specifically, as illustrated in FIG. 11, a tracking apparatus 10 of the processing system 20 has a function of detecting and tracking a person 6 registered in the first list (database 5) within an image generated by a surveillance camera 11 installed in a facility. Hereinafter, details of the processing system 20 will be described.

Figure 12:
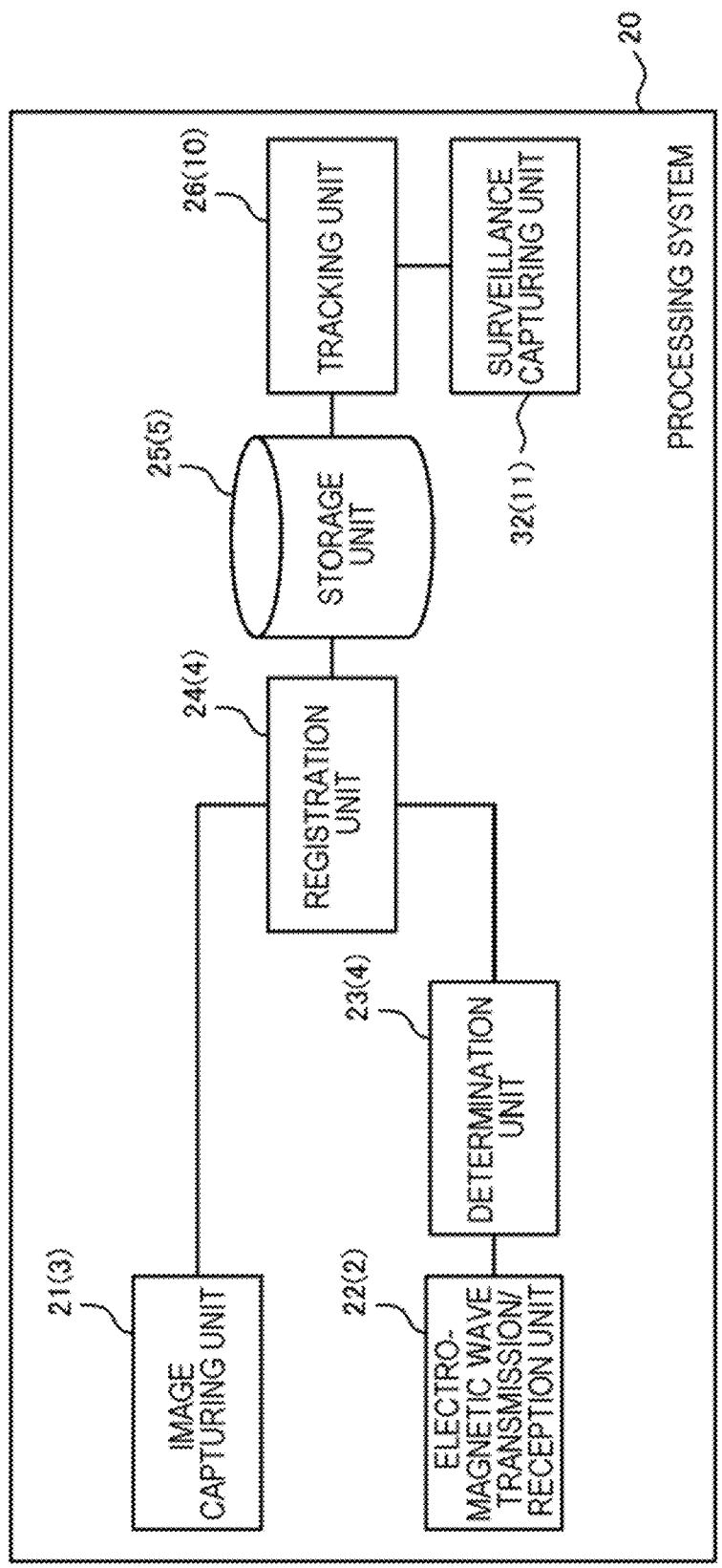
FIG. 12 is an example of a functional block diagram of a processing system of the present example embodiment.

FIG. 12 illustrates an example of a functional block diagram of the processing system 20. As illustrated in FIG. 12, the processing system 20 includes an image capturing unit 21, an electromagnetic wave transmission/reception unit 22, a determination unit 23, a registration unit 24, a storage unit 25, a tracking unit 26, and a surveillance capturing unit 32. In the case of the example of FIG. 12, the surveillance camera 11 corresponds to the surveillance capturing unit 32, the tracking apparatus 10 corresponds to the tracking unit 26, and the database 5 corresponds to the storage unit 25.

The surveillance capturing unit 32 is installed in any position in a facility and continuously captures a moving image. One surveillance capturing unit 32 may be installed or a plurality of surveillance capturing units 32 may be installed.

The tracking unit 26 detects a person 6 registered in the first list within a surveillance image generated by the surveillance capturing unit 32 (the surveillance camera 11). For example, the tracking unit 26 detects a person within the surveillance image, and detects the person 6 registered in the first list within the surveillance image by collating an image of the detected person with person images registered in the first list. Then, the tracking unit 26 tracks the detected person by using a person tracking technology.

The tracking unit 26 may register history of a detection result and a tracking result for each person 6 registered in the first list. For example, information indicating a place where an image of each person 6 has been captured (for example, moving image file identification information, elapsed time from the beginning of a moving image file, and the like) may be registered for each person 6 registered in the first list. The position of each person 6 may be registered in the surveillance image.

Furthermore, the surveillance capturing unit 32 may include a microphone and collect audio. When the audio collected by the surveillance capturing unit 32 satisfies a predetermined condition (for example, scream is detected or explosion sound is detected), the tracking unit 26 may notify a surveillant that the audio satisfies the predetermined condition, and notify the surveillant of a person existing in the surveillance image generated by the surveillance capturing unit 32 and registered in the first list. For example, the tracking unit 26 may transmit, to the surveillant, a surveillance image in which the person registered in the first list is emphasized by a frame and the like.

The other configurations of the processing system 20 are the same as those of the first and second example embodiments.

According to the processing system 20 of the present example embodiment described above, the same advantageous effect as the processing systems 20 of the first and second example embodiments can be implemented.

Furthermore, according to the processing system 20 of the present example embodiment, it is possible to detect and track a person 6 registered in the first list (database 5) within an image generated by the surveillance camera 11 installed in a facility. Therefore, a manager of the facility can recognize the position of a person 6 registered in the first list in a timely manner.

Furthermore, according to the processing system 20 of the present example embodiment, information indicating a place where an image of each person 6 has been captured (for example, moving image file identification information, elapsed time from the beginning of a moving image file, and the like) can be registered for each person 6 registered in the first list. The use of such registration information makes it possible for a surveillant to efficiently browse a portion of a surveillance image (moving image) in which an image of the person 6 registered in the first list is captured.

Furthermore, when audio collected by the surveillance capturing unit 32 satisfies the predetermined condition, the processing system 20 of the present example embodiment can notify a surveillant of a "person 6 registered in the first list", who exists in that area. Such a processing system 20 can notify a surveillant of a person requiring special attention at an appropriate timing.

Fourth Example Embodiment

Figure 13:
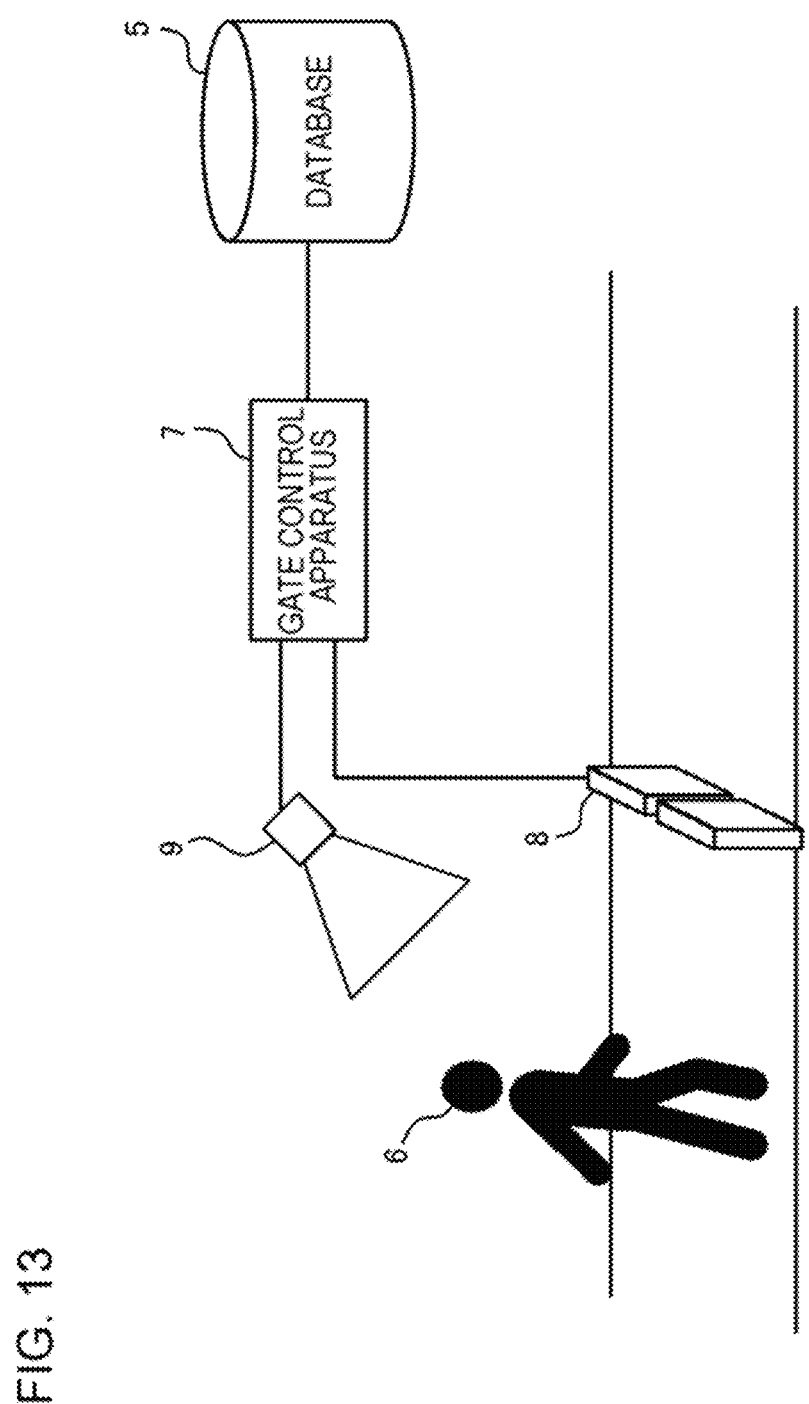
FIG. 13 is a conceptual diagram for explaining an overview of processing of a processing system of the present example embodiment.

A processing system 20 of the present example embodiment performs a process for improving security by using the aforementioned first list. Specifically, as illustrated in FIG. 13, in the present example embodiment, a gate 8 is installed in a facility. When an image generated by a camera 9 provided in the gate 8 is acquired, a gate control apparatus 7 of the processing system 20 determines whether a person 6 captured in the acquired image has been registered in the first list (database 5). On the basis of the determination result, the gate control apparatus 7 controls the opening and closing of the gate 8. Hereinafter, details of the processing system 20 will be described.

Figure 14:
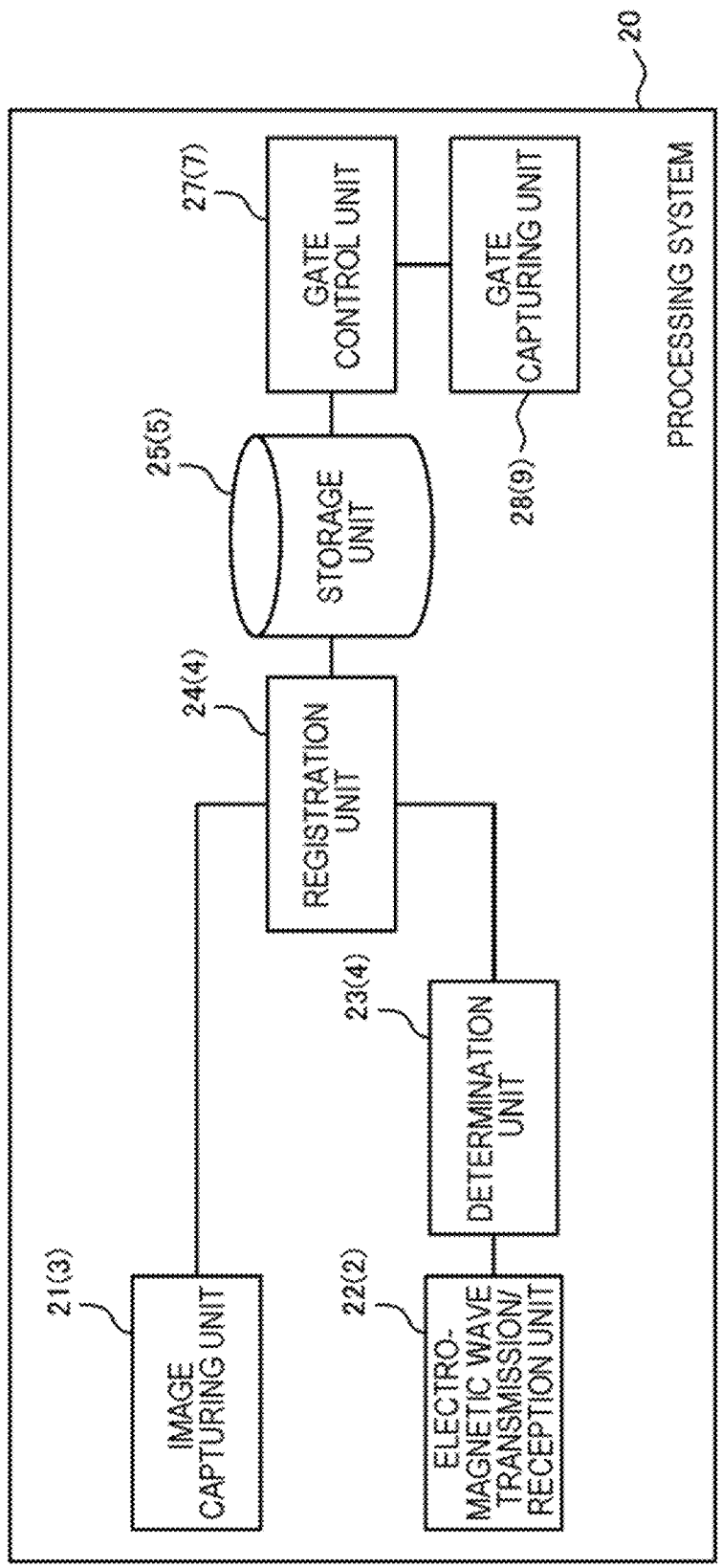
FIG. 14 is an example of a functional block diagram of a processing system of the present example embodiment.

FIG. 14 is an example of a functional block diagram of the processing system 20. As illustrated in FIG. 14, the processing system 20 includes an image capturing unit 21, an electromagnetic wave transmission/reception unit 22, a determination unit 23, a registration unit 24, a storage unit 25, a gate control unit 27, and a gate capturing unit 28. In the case of the example of FIG. 13, the camera 9 corresponds to the gate capturing unit 28, the gate control apparatus 7 corresponds to the gate control unit 27, and the database 5 corresponds to the storage unit 25. Although not illustrated in the drawing, the processing system 20 may also include the tracking unit 26 and the surveillance capturing unit 32.

The gate capturing unit 28 captures an image of a person 6 in front of the gate 8. The gate capturing unit 28 may continuously capture a moving image, or capture a still image at a predetermined timing (for example, timing when the person 6 in front of the gate 8 is detected by a human sensor and the like).

The gate control unit 27 determines whether a person 6 captured in an image generated by the gate capturing unit 28 has been registered in the first list (database 5). For example, the gate control unit 27 detects a person within the image generated by the gate capturing unit 28, and determines whether the person 6 captured in the image generated by the gate capturing unit 28 has been registered in the first list (database 5), by collating an image of the detected person with person images registered in the first list.

Then, the gate control unit 27 controls the opening and closing of the gate 8 according to whether the person 6 captured in the image generated by the gate capturing unit 28 has been registered in the first list. For example, when the person 6 captured in the image generated by the gate capturing unit 28 has been registered in the first list, the gate control unit 27 may output an instruction to close the gate 8. On the other hand, when the person 6 captured in the image generated by the gate capturing unit 28 has not been registered in the first list, the gate control unit 27 may output an instruction to open the gate 8.

The gate 8 performs an opening and closing operation on the basis of an instruction output from the gate control unit 27. For example, when a closing instruction is acquired in an opened state, the gate 8 performs a closing operation. When an opening instruction is acquired in a closed state, the gate 8 performs an opening operation. When an opening instruction is acquired in an opened state, the gate 8 maintains the opened state without performing the opening and closing operation. When a closing instruction is acquired in a closed state, the gate 8 maintains the closed state without performing the opening and closing operation. The gate 8 that performs an opening and closing operation on the basis of an instruction (electric signal) can be configured by adopting any technology.

The other configurations of the processing system 20 are the same as those of the first to third example embodiments.

According to the processing system 20 of the present example embodiment described above, the same advantageous effect as the processing systems 20 of the first to third example embodiments can be implemented.

Furthermore, according to the processing system 20 of the present example embodiment, the opening and closing of the gate 8 can be controlled by using the first list. As a consequence, it is possible effectively prevent a person requiring special attention, who possesses a dangerous object and the like, from passing through the gate 8 and entering an area thereafter.

In the above description, the opening and closing of the gate 8 is controlled according to whether a person 6 captured in an image generated by the camera 9 installed in the gate 8 has been registered in the first list; however, as a modification, the opening and closing of the gate 8 may be controlled according to the determination result of belongings inspection by the determination unit 23. For example, when the gate 8 is installed immediately after the first area 1 where walk-through type belongings inspection is performed or when a subsequent movement route of a person 6 who has passed through the first area 1 is determined (there is no escape route) and the processing system 20 can recognize the position of the person 6 up to the gate 8, the modification can be adopted. Even in the modification, the same advantageous effect is implemented.

Fifth Example Embodiment

Figure 15:
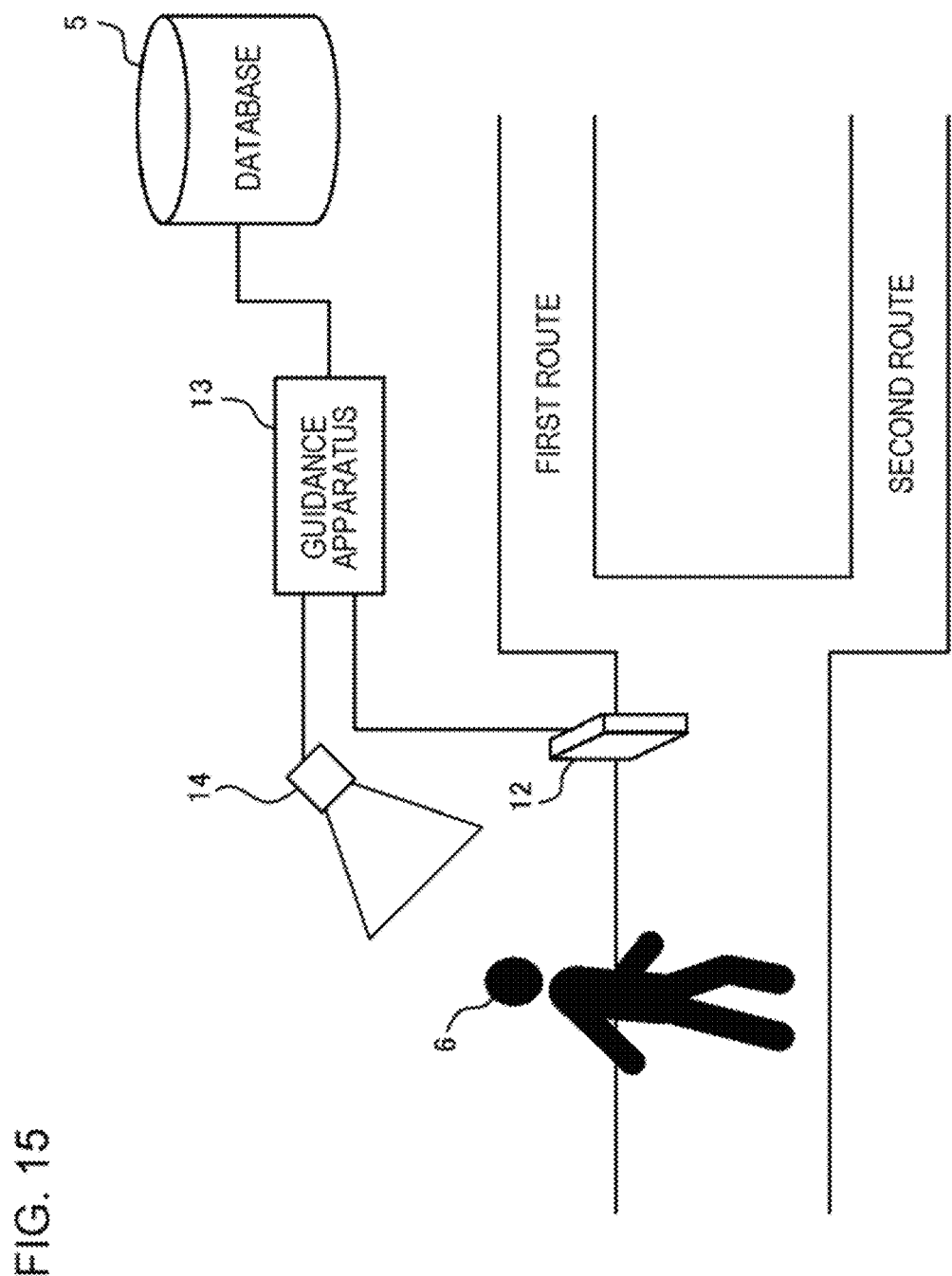
FIG. 15 is a conceptual diagram for explaining an overview of processing of a processing system of the present example embodiment.

A processing system 20 of the present example embodiment performs a process for improving security by using the aforementioned first list. Specifically, as illustrated in FIG. 15, in the present example embodiment, a branch point is installed in a facility. After the branch point, for example, it may be divided into a plurality of routes, a plurality of windows, a plurality of persons in charge, a plurality of inspection stations, or others.

When an image generated by a camera 14 provided at the branch point is acquired, a guidance apparatus 13 of the processing system 20 determines whether a person 6 captured in the acquired image has been registered in the first list (database 5). On the basis of the determination result, the guidance apparatus 13 determines an option to which the person 6 is guided among a plurality of options after the branch point, and outputs the determination content to an output apparatus 12. Hereinafter, details of the processing system 20 will be described.

Figure 16:
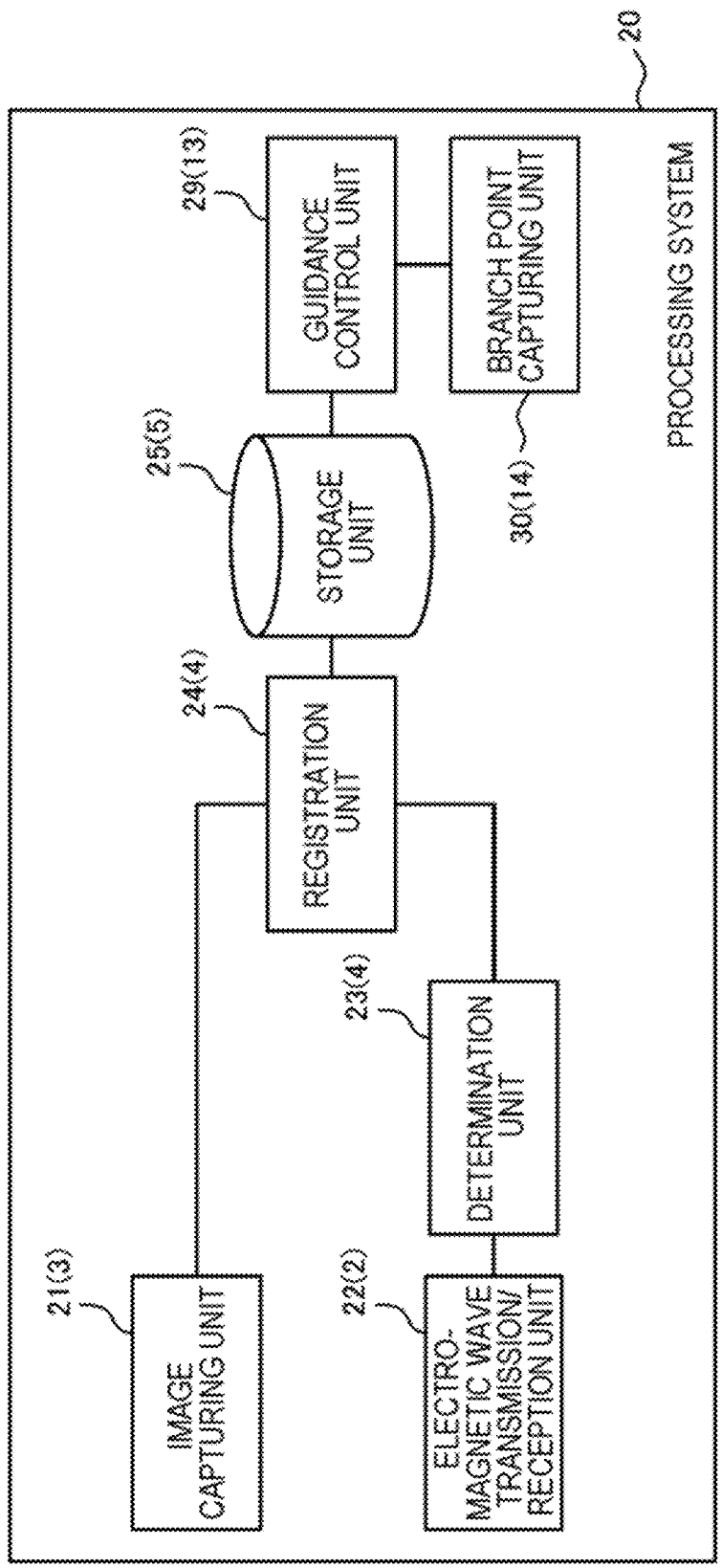
FIG. 16 is an example of a functional block diagram of a processing system of the present example embodiment.

FIG. 16 is an example of a functional block diagram of the processing system 20. As illustrated in FIG. 16, the processing system 20 includes an image capturing unit 21, an electromagnetic wave transmission/reception unit 22, a determination unit 23, a registration unit 24, a storage unit 25, a guidance control unit 29, and a branch point capturing unit 30. In the case of the example of FIG. 15, the camera 14 corresponds to the branch point capturing unit 30, the guidance apparatus 13 corresponds to the guidance control unit 29, and the database 5 corresponds to the storage unit 25. Although not illustrated in the drawing, the processing system 20 may also include the tracking unit 26 and the surveillance capturing unit 32. Furthermore, the processing system 20 may also include the gate control unit 27 and the gate capturing unit 28.

The branch point capturing unit 30 captures an image of a person 6 in front of the branch point. The branch point capturing unit 30 may continuously capture a moving image, or capture a still image at a predetermined timing (for example, timing when the person 6 in front of the branch point is detected by a human sensor and the like).

The guidance control unit 29 determines whether a person 6 captured in an image generated by the branch point capturing unit 30 has been registered in the first list (database 5). For example, the guidance control unit 29 detects a person within the image generated by the branch point capturing unit 30, and determines whether the person 6 captured in the image generated by the branch point capturing unit 30 has been registered in the first list (database 5), by collating an image of the detected person with person images registered in the first list.

Then, the guidance control unit 29 provides guidance after the branch point according to whether the person 6 captured in the image generated by the branch point capturing unit 30 has been registered in the first list. For example, the content of guidance related to when the person 6 has been registered in the first list and when the person 6 has not been registered in the first list may be registered in advance. For example, when the person 6 has been registered in the first list, guidance to a "first route" may be registered, and when the person 6 has not been registered in the first list, guidance to a "second route" may be registered. Then, the guidance control unit 29 may allow the output apparatus 12 to output guidance related to the determination result regarding whether the person 6 captured in the image generated by the branch point capturing unit 30 has been registered in the first list. The output apparatus 12 is an output apparatus such as a display, a speaker, and a projection apparatus.

The other configurations of the processing system 20 are the same as those of the first to fourth example embodiments.

According to the processing system 20 of the present example embodiment described above, the same advantageous effect as the processing systems 20 of the first to fourth example embodiments can be implemented.

Furthermore, according to the processing system 20 of the present example embodiment, a person 6 at the branch point can be appropriately guided by using the first list. As a consequence, a person requiring special attention, who possesses a dangerous object and the like, can be guided to a predetermined place, and appropriate processing such as detailed inspection and securing of identity can be performed.

In the above description, the content to be guided is determined according to whether a person 6 captured in an image generated by the camera 14 installed at the branch point has been registered in the first list; however, as a modification, the content to be guided may be determined according to the determination result of belongings inspection by the determination unit 23. For example, when the branch point is installed immediately after the first area 1 where walk-through type belongings inspection is performed or when a subsequent movement route of a person 6 who has passed through the first area 1 is determined (there is no escape route) and the processing system 20 can recognize the position of the person 6 up to the branch point, the modification can be adopted. Even in the modification, the same advantageous effect is implemented.

Sixth Example Embodiment

Figure 17:
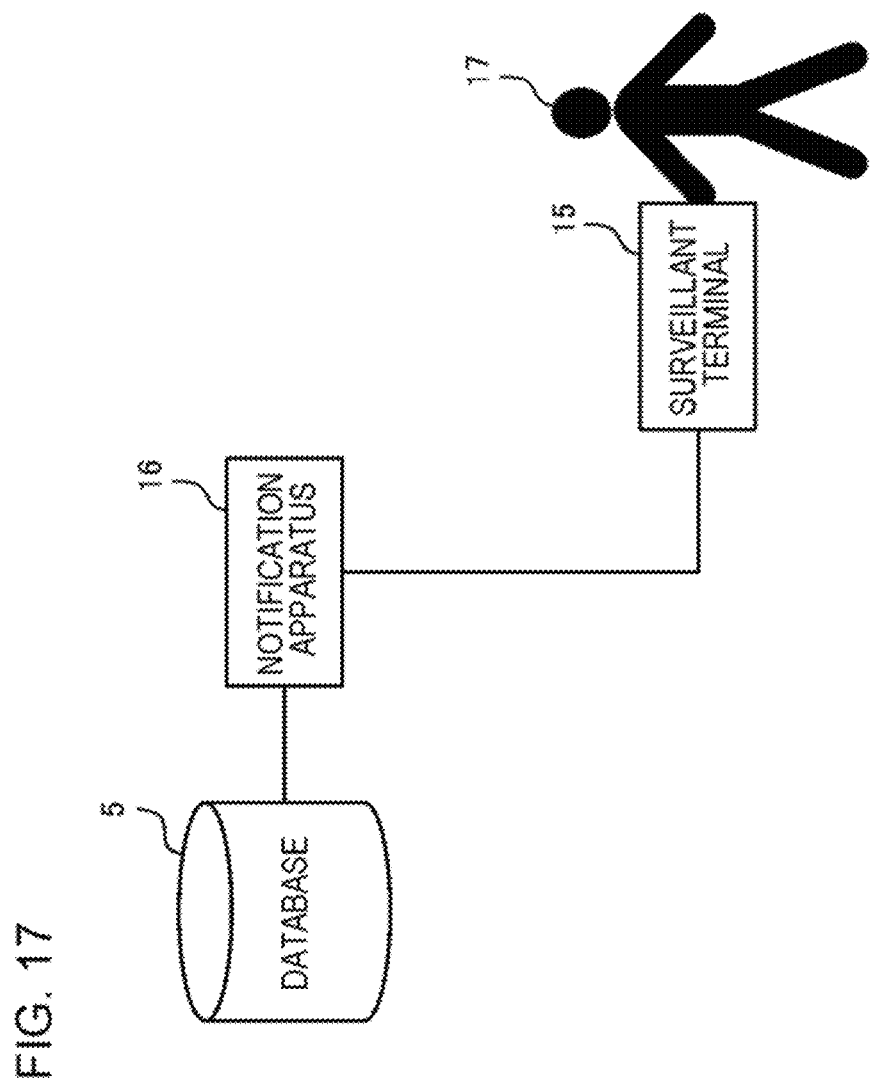
FIG. 17 is a conceptual diagram for explaining an overview of processing of a processing system of the present example embodiment.

A processing system 20 of the present example embodiment performs a process for improving security by using the aforementioned first list. Specifically, as illustrated in FIG. 17, a notification apparatus 16 of the processing system 20 transmits the first list (database 5) to a surveillant terminal 15. Then, a surveillant 17 confirms the first list via the surveillant terminal 15. Hereinafter, details of the processing system 20 will be described.

Figure 18:
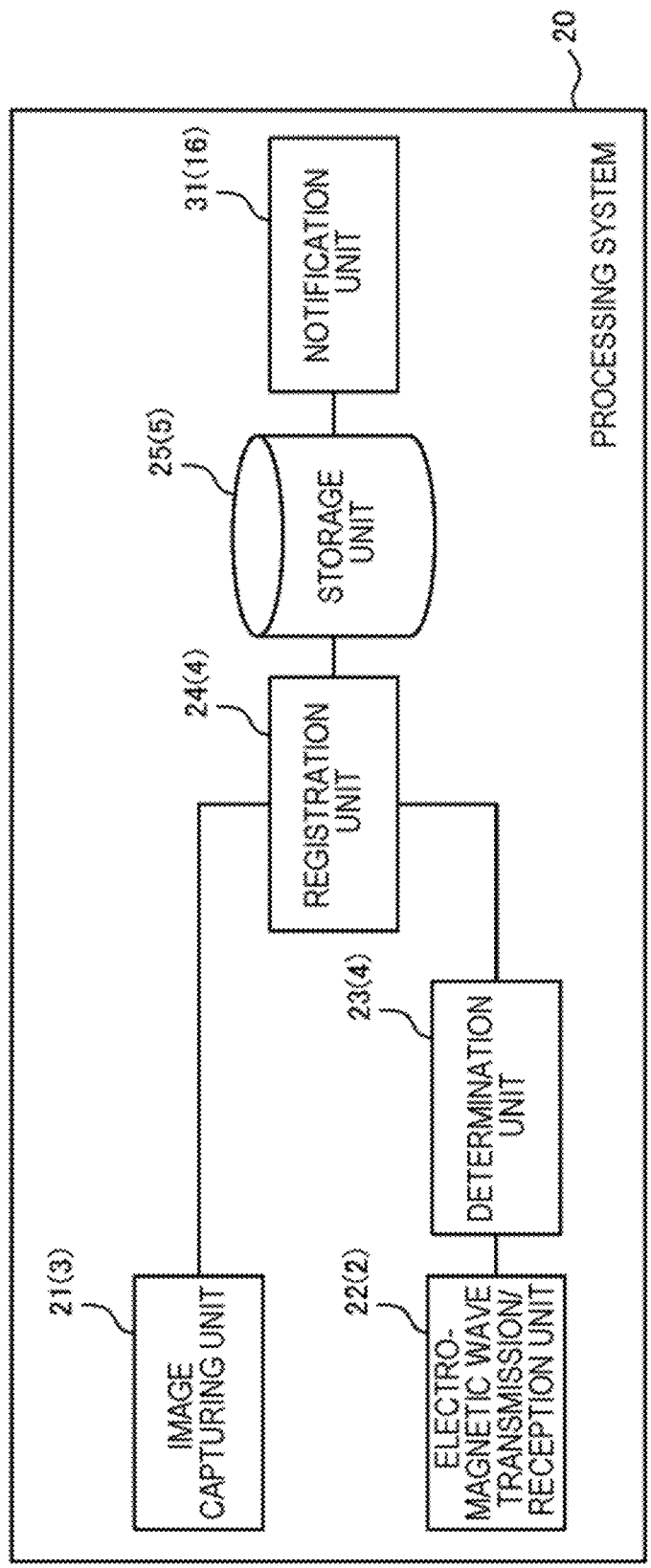
FIG. 18 is an example of a functional block diagram of a processing system of the present example embodiment.

FIG. 18 illustrates an example of a functional block diagram of the processing system 20. As illustrated in FIG. 18, the processing system 20 includes an image capturing unit 21, an electromagnetic wave transmission/reception unit 22, a determination unit 23, a registration unit 24, a storage unit 25, and a notification unit 31. In the case of the example of FIG. 17, the notification apparatus 16 corresponds to the notification unit 31 and the database 5 corresponds to the storage unit 25. Although not illustrated in the drawing, the processing system 20 may also include the tracking unit 26 and the surveillance capturing unit 32. Furthermore, the processing system 20 may also include the gate control unit 27 and the gate capturing unit 28. Furthermore, the processing system 20 may also include the guidance control unit 29 and the branch point capturing unit 30.

The notification unit 31 transmits the first list to the surveillant terminal 15 via a network such as the Internet, or a wired cable. For example, the notification unit 31 may transmit the first list to the surveillant terminal 15 whenever the first list is updated. The surveillant terminal 15 may be a portable terminal such as a smart phone, a tablet terminal, a smart watch, and a mobile phone, or may be a stationary terminal.

The other configurations of the processing system 20 are the same as those of the first to fifth example embodiments.

According to the processing system 20 of the present example embodiment described above, the same advantageous effect as the processing systems 20 of the first to fifth example embodiments can be implemented.

Furthermore, according to the processing system 20 of the present example embodiment, it is possible to transmit the first list to the surveillant terminal 15. As a consequence, the surveillant 17 can confirm the first list via the surveillant terminal 15.

Although the present invention has been described with reference to example embodiments (and examples), the present invention is not limited to the above example embodiments (and examples). Various modifications that a person skilled in the art can appreciate may be applied to the structure and details of the present invention within the scope of the present invention.

Some or all of the above example embodiments may be described as in the following supplementary notes; however, the present invention is not limited thereto.

1. A processing system including: an image capturing means that captures an image of a person passing through a first area and generates a person image indicating an appearance of the person; an electromagnetic wave transmission/reception means that emits an electromagnetic wave having a wavelength of 30 micrometers or more and 1 meter or less toward the person passing through the first area, and receives a reflected wave; a determination means that determines whether the person possesses a pre-designated object, based on a signal of the received reflected wave; and a registration means that registers, in a first list, the person image of the person determined to possess the pre-designated object.
2. The processing system according to 1, wherein the determination means generates a transmission image based on the signal of the received reflected wave, and determines whether the person possesses the pre-designated object, based on a shape appearing in the transmission image.
3. The processing system according to 1, wherein the determination means extracts a transmission feature value based on the signal of the received reflected wave, and determines whether the person possesses the pre-designated object, based on the transmission feature value.
4. The processing system according to any one of 1 to 3, wherein the registration means registers the person image and a determination result of the determination means in a log in association with each other.
5. The processing system according to any one of 1 to 4, further including a tracking means that detects a person registered in the first list within an image generated by a surveillance camera, and tracks the person within the image.
6. The processing system according to any one of 1 to 5, further including: a gate capturing means that captures an image of a person in front of a gate; and a gate control means that controls opening and closing of the gate according to whether a person captured in an image generated by the gate capturing means has been registered in the first list.
7. The processing system according to any one of 1 to 6, further including: a branch point capturing means that captures an image of a person in front of a branch point; and a guidance control means that provides guidance after the branch point according to whether a person captured in an image generated by the branch point capturing means has been registered in the first list.
8. The processing system according to any one of 1 to 7, further including a notification means that transmits the first list to a surveillance terminal.
9. The processing system according to any one of 1 to 8, wherein, when a person registered in the first list has been registered in a white list generated in advance, the registration means deletes the person image of the person from the first list.
10. The processing system according to any one of 1 to 9, wherein the determination means detects a timing when a person has entered the first area and a timing when the person has exited the first area, based on a signal of the received reflected wave, and divides a signal of the received reflected wave for each person based on the detected timing.
11. The processing system according to any one of 1 to 10, wherein a screen that indicates at least a part of the person image generated by the image capturing means, a determination result of the determination means, a transmission image generated based on a signal of the reflected wave received by the electromagnetic wave transmission/reception means, and a log being generated by the registration means and indicating a determination result of the determination means for each of a plurality of persons who have passed the first area, is output.
12. A processing method including, by a processing system: capturing an image of a person passing through a first area and generating a person image indicating an appearance of the person; emitting an electromagnetic wave having a wavelength of 30 micrometers or more and 1 meter or less toward the person passing through the first area, and receiving a reflected wave; determining whether the person possesses a pre-designated object, based on a signal of the received reflected wave; and registering, in a first list, the person image of the person determined to possess the pre-designated object.
13. A program that causes a computer of a processing system to function as: an image capturing means that captures an image of a person passing through a first area and generates a person image indicating an appearance of the person; a determination means that determines whether the person possesses a pre-designated object, based on a signal of a reflected wave of an electromagnetic wave having a wavelength of 30 micrometers or more and 1 meter or less and being emitted toward the person passing through the first area; and a registration means that registers, in a first list, the person image indicating an appearance of the person determined to possess the pre-designated object and being generated by capturing an image of the person passing through the first area.

The invention claimed is:

1. A processing system comprising:
   at least one memory configured to store one or more instructions; and
   at least one processor configured to execute the one or more instructions to:
   capture an image of a person passing through a first area and generate a person image indicating an appearance of the person;
   emit an electromagnetic wave having a wavelength of 30 micrometers or more and 1 meter or less toward the person passing through the first area, and receive a reflected wave;
   determine whether the person possesses a pre-designated object based on a feature value appearing in a signal of the received reflected wave without generating a transmission image based on the signal of the received reflected wave; and
   register, in a first list, the person image of the person determined to possess the pre-designated object.

2. The processing system according to claim 1, wherein the processor is further configured to execute the one or more instructions to generate a transmission image, based on the signal of the received reflected wave, and determine whether the person possesses the pre-designated object, based on a shape appearing in the transmission image.

3. The processing system according to claim 1, wherein the processor is further configured to execute the one or more instructions to extract a transmission feature value, based on the signal of the received reflected wave, and determine whether the person possesses the pre-designated object, based on the transmission feature value.

4. The processing system according to claim 1, wherein the processor is further configured to execute the one or more instructions to register the person image and a result of the determining in a log in association with each other.

5. The processing system according to claim 1, wherein the processor is further configured to execute the one or more instructions to detect a person registered in the first list within an image generated by a surveillance camera, and track the person within the image.

6. The processing system according to claim 1, wherein the processor is further configured to execute the one or more instructions to:
   capture an image of a person in front of a gate; and
   control opening and closing of the gate according to whether a person captured in the image has been registered in the first list.

7. The processing system according to claim 1, wherein the processor is further configured to execute the one or more instructions to:
   capture an image of a person in front of a branch point; and
   provide guidance after the branch point according to whether a person captured in the image has been registered in the first list.

8. The processing system according to claim 1, wherein the processor is further configured to execute the one or more instructions to transmit the first list to a surveillant terminal.

9. The processing system according to claim 1, wherein the processor is further configured to execute the one or more instructions to detect, when a person registered in the first list has been registered in a white list generated in advance, the person image of the person from the first list.

10. The processing system according to claim 1, wherein the processor is further configured to execute the one or more instructions to detect a timing when a person has entered the first area and a timing when the person has exited the first area, based on a signal of the received reflected wave, and divide a signal of the received reflected wave for each person, based on the detected timing.

11. The processing system according to claim 1, wherein the processor is further configured to execute the one or more instructions to output a screen that indicates at least a part of the person image, a result of the determining, a transmission image generated based on a signal of the reflected wave, and a log indicating result of the determining for each of a plurality of persons who have passed the first area.

12. A processing method comprising,
    by a processing system:
    capturing an image of a person passing through a first area and generating a person image indicating an appearance of the person;
    emitting an electromagnetic wave having a wavelength of 30 micrometers or more and 1 meter or less toward the person passing through the first area, and receiving a reflected wave;
    determining whether the person possesses a pre-designated object, based on a feature value appearing in a signal of the received reflected wave without generating a transmission image based on the signal of the received reflected wave; and
    registering, in a first list, the person image of the person determined to possess the pre-designated object.

13. A non-transitory storage medium storing a program that causes a computer of a processing system to:
    capture an image of a person passing through a first area and generate a person image indicating an appearance of the person;
    determine whether the person possesses a pre-designated object, based on a feature value appearing in a signal of a reflected wave of an electromagnetic wave having a wavelength of 30 micrometers or more and 1 meter or less and being emitted toward the person passing through the first area without generating a transmission image based on the signal of the received reflected wave; and
    register, in a first list, the person image indicating an appearance of the person determined to possess the pre-designated object and being generated by capturing an image of the person passing through the first area.

* * * * *